US006987551B2

(12) United States Patent
Suzuki et al.

(10) Patent No.: US 6,987,551 B2
(45) Date of Patent: Jan. 17, 2006

(54) IN-PLANE SWITCHING LIQUID CRYSTAL DISPLAY UNIT HAVING TINTING COMPENSATION

(75) Inventors: Teruaki Suzuki, Tokyo (JP); Shinichi Nishida, Tokyo (JP); Hideya Murai, Tokyo (JP); Masayoshi Suzuki, Tokyo (JP); Makoto Watanabe, Tokyo (JP); Yoshihiko Hirai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/350,077

(22) Filed: Jan. 24, 2003

(65) Prior Publication Data

US 2003/0133068 A1    Jul. 17, 2003

Related U.S. Application Data

(62) Division of application No. 08/965,619, filed on Nov. 6, 1997, now Pat. No. 6,583,839.

(30) Foreign Application Priority Data

| Nov. 6, 1996 | (JP) | ................................. 96/293897 |
| Mar. 6, 1997 | (JP) | ................................. 97/051899 |
| Apr. 28, 1997 | (JP) | ................................. 97/111160 |

(51) Int. Cl.
   *G02F 1/1343* (2006.01)
(52) U.S. Cl. .................................................... 349/141
(58) Field of Classification Search ................. 349/141
   See application file for complete search history.

(56) References Cited

U.S. PATENT DOCUMENTS

| 4,521,080 | A | | 6/1985 | Funada et al. |
| 5,598,285 | A | * | 1/1997 | Kondo et al. ................. 349/39 |
| 5,734,451 | A | * | 3/1998 | Yanagawa et al. ............ 349/43 |
| 5,745,207 | A | | 4/1998 | Asada et al. |
| 5,757,455 | A | | 5/1998 | Sugiyama et al. |
| 5,793,459 | A | | 8/1998 | Toko |
| 5,831,700 | A | | 11/1998 | Li et al. |
| 5,894,361 | A | | 4/1999 | Yamazaki et al. |
| 5,907,380 | A | | 5/1999 | Lien |

(Continued)

FOREIGN PATENT DOCUMENTS

JP          61-34134       3/1986

(Continued)

OTHER PUBLICATIONS

"Theoretical and Experimental Study of Nematic Liquid Crystal Display Cells Using the In-Plane Switching Mode, Di Pasquale, et al., IEEE Transactions on Electron Devices, vol. 46, No. 4, Apr. 1999.

(Continued)

*Primary Examiner*—Kenneth Parker
(74) *Attorney, Agent, or Firm*—Sughrue Mion, PLLC

(57) ABSTRACT

An in-plane-switching liquid crystal display unit has a two-dimensional matrix of pixel regions each including a first auxiliary region and a second auxiliary region. When no electric field is applied, liquid crystal molecules in the first and second auxiliary regions are directed in respective orientations that lie at 90° with respect to each other. When a voltage is applied, the liquid crystal molecules are rotated in the same direction while maintaining their orientations in the first and second auxiliary regions at 90° with respect to each other. Alternatively, the liquid crystal molecules in the first and second auxiliary regions are directed in the same orientation when no electric field is applied, and when a voltage is applied, the liquid crystal molecules are rotated opposite directions while maintaining their orientations in symmetric relationship.

17 Claims, 16 Drawing Sheets

U.S. PATENT DOCUMENTS 5,977,562 A * 11/1999 Hirakata et al. .............. 257/72
6,266,116 B1    7/2001 Ohta et al.

FOREIGN PATENT DOCUMENTS

| JP | 6-51321 | 2/1994 |
|---|---|---|
| JP | 7-64119 | 3/1995 |
| JP | 7-191336 | 7/1995 |
| JP | 08029812 A * | 2/1996 |
| JP | 8-179368 | 7/1996 |
| JP | 08313923 | 11/1996 |
| JP | 9-258269 | 10/1997 |
| JP | 10-062802 | 3/1998 |
| JP | 10-148833 | 6/1998 |
| WO | WO 96/10775 | 4/1996 |

OTHER PUBLICATIONS

Society for Information Display, Proceedings of the 16th International Display Research Conference, Oct. 1-3, 1996, "LP-A: Display Characteristics of In-Plane-Switching (IPS) LCDs and a Wide-Viewing-Angle 14.5-in. IPS TFT-LCD. Matsumoto, et al.

* cited by examiner $\Delta n' = n' - n_o < n_e - n_o$ (DIRECTION IN WHICH IMAGE LOOKS BLUISH)

$\Delta n' = n_e - n_o$ (DIRECTION IN WHICH IMAGE LOOKS REDDISH)

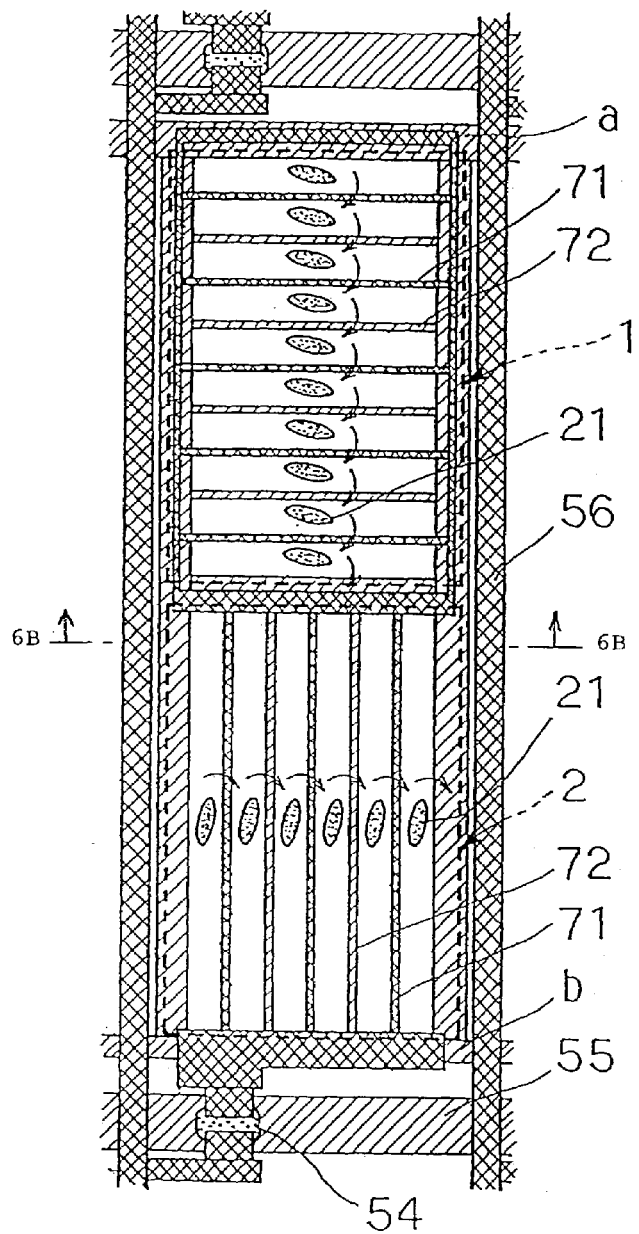
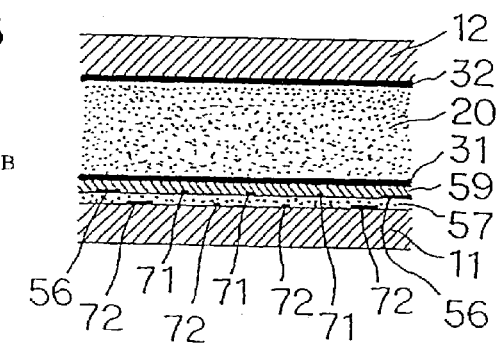

DIRECTION IN WHICH LIQUID CRYSTAL IS INTRODUCED

IN-PLANE SWITCHING LIQUID CRYSTAL DISPLAY UNIT HAVING TINTING COMPENSATION

This is a divisional of application Ser. No. 08/965,619, filed Nov. 6, 1997 now U.S. Pat. No. 6,583,839; the disclosure of which is incorporated herein by reference.

BACKGROUND OF THE INVENTION

1. Field of the Invention

The present invention relates to a liquid crystal display unit, and more particularly to an in-plane-switching (IPS) active-matrix liquid crystal display unit.

2. Description of the Related Art

Liquid crystal display (LCD) units are generally characterized by low-profile shapes, lightweight structures, and low-power requirements. Particularly, active-matrix liquid crystal display (AM-LCD) units which comprise a two-dimensional matrix of pixels energizable by active devices are highly promising as high-image-quality flat panel displays. Among those active-matrix liquid crystal display units which are finding widespread use are thin-film-transistor liquid crystal display (TFT-LCD) units which employ thin-film transistors (TFTs) used as active devices for switching individual pixels.

Conventional AM-LCD units utilize a twisted-nematic (TN) electrooptical effect, and comprise a liquid crystal layer sandwiched between two substrates. The liquid crystal layer is activated when an electric field is applied substantially perpendicularly to the substrates.

U.S. Pat. No. 3,807,831 discloses an in-plane-switching liquid crystal display unit having a liquid crystal layer which is activated when an electric field is applied substantially parallel to two substrates which sandwich the liquid crystal layer therebetween, the liquid crystal display unit including interleaved arrays of alternate parallel electrodes.

Japanese patent publication No. 21907/88 reveals an AM-LCD unit based on a TN electrooptical effect and including interleaved or interdigitating arrays of alternate parallel electrodes for the purpose of reducing parasitic capacitance between a common electrode and a drain bus line or between a common electrode and a gate bus line.

FIG. 1 of the accompanying drawings shows a conventional in-plane-switching liquid crystal display unit. The illustrated conventional liquid crystal display unit comprises a liquid crystal layer sandwiched between two glass substrates 11, 12, and interdigitating arrays of alternate parallel electrodes 70 mounted on one of the glass substrates 11. When a voltage is applied between the electrodes 70, a liquid crystal activating electric field E1 is generated parallel to the glass substrates 11, 12 and perpendicularly to the interdigitating teeth of the electrodes 70 for thereby changing the orientation of liquid crystal molecules 21. Therefore, the application of the voltage between the electrodes 70 is effective to control the transmittance of light through the liquid crystal layer. The term "the orientation of liquid crystal molecules" used in this specification means the direction of the longer axis of liquid crystal molecules.

With the in-plane-switching liquid crystal display unit shown in FIG. 1, it is necessary that when the voltage is applied, the liquid crystal molecules be rotated in a certain direction in order to achieve stable displays. To meet such a requirement, it is customary to initially orient the liquid crystal molecules in a direction that is slightly shifted from a direction perpendicular to the liquid crystal activating electric field. Specifically, the liquid crystal molecules are initially oriented at an angle of $\phi_{LCO}$ (<90°) with respect to a direction perpendicular to the parallel pairs of the interdigitating teeth of the electrodes. In the specification, the direction of the electric field and the orientation of the liquid crystal molecules will be described in the range of from −90° to 90° (the counterclockwise direction being positive) with respect to a reference direction ($\phi=0$) which is perpendicular to the parallel pairs of the interdigitating teeth of the electrodes. As described later on, in order to accomplish sufficient display contrast, it is necessary to rotate the liquid crystal molecules 45° from the initial orientation. Therefore, it is preferable to orient the liquid-crystal molecules at an angle of $\phi_{LCO}$ in the range of $45° \leq \phi_{LCO} < 90°$. In the in-plane-switching liquid crystal display unit shown in FIG. 1, the initial orientation of the liquid crystal molecules is slightly shifted clockwise (as viewed from the upper substrate 12) from the parallel pairs of the interdigitating teeth of the electrodes. When the voltage is applied, therefore, the liquid crystal molecules are rotated clockwise as indicated by the arrows.

The transmittance T of light passing through the liquid crystal cell shown in FIG. 1 which is sandwiched between two confronting polarizers whose axes of polarization transmission (directions of polarization) are perpendicular to each other is expressed by the following equation (1):

$$T = \frac{1}{2}\sin^2\{2(\phi_P - \phi_{LC})\}\sin^2\left(\frac{\pi \Delta n d}{\lambda}\right) \quad (1)$$

where $\phi_{LC}$ represents the orientation of the liquid crystal molecules when a voltage is applied thereto, $\phi_P$ the direction of the axis of transmission of the polarizer on which the light falls, $\Delta n$ the refractive index anisotropy of the liquid crystal layer, d the thickness of the cell (the thickness of the liquid crystal layer, and $\lambda$ the wavelength of the light. The direction $\phi_A$ of the axis of transmission of the polarizer from which the light exits is expressed by $\phi_A = \phi_P + 90°$ or $\phi_A = \phi_P - 90°$. It is possible to control the transmittance of the light by varying the orientation $\phi_{LC}$ of the liquid crystal molecules with a liquid crystal activating electric field parallel to the substrates based on the above equation (1). If the direction of the axis of transmission of one of the polarizers and the initial orientation of the liquid crystal molecules are in agreement with each other ($\phi_{LCO} = \phi_P$ or $\phi_{LCO} = \phi_A$), then the liquid crystal display unit is brought into a dark display state when no voltage is applied. If the orientation of the liquid crystal molecules is rotated substantially 45° under a liquid crystal activating electric field, then the transmittance becomes highest, and the liquid crystal display unit is brought into a bright display state. Of course, the polarizers may be so arranged that the liquid crystal display unit will be brought into a dark display state when a voltage is applied.

It has been assumed for the sake of brevity that the liquid crystal molecules in the liquid crystal layer between the upper and lower substrates are uniformly rotated. Discussions based on such a simplified model do not essentially affect the principles of the present invention. Actually, however, those liquid crystal molecules which are held in contact with the surfaces of the upper and lower substrates are relatively firmly fixed in position, and do not basically change their orientation, whereas those liquid crystal molecules which are positioned nearly intermediate between the upper and lower substrates change their orientation to a greater extent. In view of these practical considerations, the in-plane angle $\phi_{LC}$ through which the liquid crystal molecules rotate under an applied electric field is represented as a function of coordinates in the transverse direction of the liquid crystal layer.

In order to accomplish sufficient display contrast, the orientation of the liquid crystal molecules may be rotated substantially 45° in the entire liquid crystal layer. However, for the reasons described above, the liquid crystal molecules which are positioned nearly intermediate between the upper and lower substrates are actually rotated more than 45°.

Published Japanese translation No. 505247/93 of a PCT international publication (International publication No. WO91/10936) describes improvements of angle of view characteristics, which have been poor in TN liquid crystal display devices, achieved by the in-plane-switching liquid crystal display unit. Because of their excellent angle of view characteristics, in-plane-switching active-matrix liquid crystal display units have recently been considered as a candidate for large-size display monitors.

FIG. 2 of the accompanying drawings shows the transmittance of the liquid crystal display unit shown in FIG. 1 as it varies when the applied voltage is changed, with respect to various observational directions in which the liquid crystal display unit is observed. The observational directions are defined as $\phi_{obs}$ and $\theta_{obs}$ where $\phi_{obs}$ is an angle of orientation with respect to a direction perpendicular to the direction of the electrodes and $\theta_{obs}$ is an angle of tilt from a direction perpendicular to the substrates. A sample liquid crystal cell used in obtaining the measurements shown in FIG. 2 was arranged such that $\phi_{LC}$=85°, $\phi_P$=85°, and $\phi_A$=−5°. The sample liquid crystal cell had interdigitating arrays of alternate parallel electrodes, including interdigitating teeth each having a width of 5 μm with adjacent ones of the interdigitating teeth being spaced 15 μm from each other. The sample liquid crystal cell had a liquid crystal material whose refractive index anisotropy Δn is 0.067. The sample liquid crystal cell had a thickness of 4.9 μm. It can be seen from FIG. 2 that the transmittance does not change largely depending on the observational direction. Therefore, the in-plane-switching liquid crystal display unit shown in FIG. 1 has excellent angle of view characteristics.

However, the in-plane-switching liquid crystal display unit shown in FIG. 1 suffers a problem in that displayed images may look bluish or reddish to a viewer depending on the observational direction.

FIG. 3 of the accompanying drawings shows the transmittance of the liquid crystal display unit shown in FIG. 1 as it varies with the wavelength with respect to various observational directions when the liquid crystal display unit is brought into a bright display state. The measurements shown in FIG. 3 were obtained from the same liquid crystal cell as the one used to obtain the measurements shown in FIG. 2. In the liquid crystal cell, the orientation $\phi_{LC}$ of the liquid crystal molecules is 40° because when the liquid crystal cell is brought into a bright display state, i.e., when a voltage is applied, the orientation $\phi_{LC}$ changes about 45° from the initial orientation $\phi_{LCO}$=85°. It can be understood from FIG. 3 that when the liquid crystal cell is brought into a bright display state, the peak of the transmission spectrum at the observational direction $\phi_{obs}$=40° is shifted toward shorter wavelengths, making displayed images bluish, and the peak of the transmission spectrum at the observational direction $\phi_{obs}$=−50° is shifted toward longer wavelengths, making displayed images reddish. The same tendency was observed at those observational directions which are 180° spaced from the above observational directions.

As described above, while the in-plane-switching liquid crystal display unit has much better characteristics than the conventional TN liquid crystal display units with regard to display contrast and freedom from gradation reversal, it suffers the problem of tilts depending on the observational direction.

In the above liquid crystal cell, the liquid crystal molecules are directed at the initial orientation $\phi_{LCO}$=85° in the absence of any applied voltage. When a voltage is applied to bring the liquid crystal cell into a bright display state, the orientation $\phi_{LC}$ of the liquid crystal molecules is 40° because the orientation $\phi_{LC}$ changes about 45° from the initial orientation $\phi_{LCO}$=85°. The direction in which displayed images look bluish to the viewer corresponds to this orientation $\phi_{LC}$ of the liquid crystal molecules, and the direction in which displayed images look reddish to the viewer corresponds to the orientation perpendicular to the orientation $\phi_{LC}$. In a display mode based on birefringence, as achieved by the above liquid crystal cell, light having a wavelength which satisfies the relationship of Δn·d=λ/2 passes most efficiently through the liquid crystal cell, as can be seen from the equation (1). The tinting depending on the angle of view, i.e., the angle at which the liquid crystal cell is observed, is caused by the dependency of the birefringence (Δn·d) of the liquid crystal layer on the angle of view.

The dependency of the birefringence of the liquid crystal layer on the angle of view will be described in detail below.

It is assumed that the angle formed between the direction of travel of light and the longitudinal direction of liquid crystal molecules is represented by $\theta_2$, the refractive index with respect to an ordinary ray of light which is vibrated (polarized) in a direction perpendicular to a direction called the optic axis of crystal is represented by $n_o$, and the refractive index with respect to an extraordinary ray of light which is vibrated (polarized) parallel to the optic axis is represented by $n_e$. Effective refractive index anisotropy Δn' when light is obliquely applied to the liquid crystal cell is given by the following equation (2):

$$\Delta n' = \frac{n_e n_o}{\sqrt{n_e \cos^2\theta_2 + n_o \sin^2\theta_2}} - n_o \qquad (2)$$

When light is applied perpendicularly to the liquid crystal cell, since $\theta_2$=90°, the effective refractive index anisotropy Δn' is given as Δn'=$n_e$−$n_o$. In the direction in which displayed images look bluish to the viewer, because the angle of view is tilted to the longitudinal direction of liquid crystal molecules, the angle $\theta_2$ becomes $\theta_2$<90° and Δn' becomes smaller. In the direction in which displayed images look reddish to the viewer, because the angle of view is tilted to a direction perpendicular to the longitudinal direction of liquid crystal molecules, the angle $\theta_2$ remains $\theta_2$=90° and Δn'=Δn. FIGS. 4A and 4B illustrate the refractive index anisotropy as it varies with the angle of view.

When light is applied obliquely to the liquid crystal cell, since the substantial thickness d' of the liquid crystal layer is given by d'=d/cos $\theta_{obs}$, the substantial thickness d' becomes larger independent of the direction in which the angle of view is tilted.

Because of changes of both the refractive index anisotropy and the thickness of the liquid crystal layer, the birefringence (Δn'·d') varies, changing the tint depending on the angle of view.

Table 1 shown below contains details of the tinting.

TABLE 1

| | Δn | d | Δn · d | Remarks |
|---|---|---|---|---|
| Bluish tint | Reduced | Increased | Reduced | * |
| Reddish tint | Unchanged | Increased | Increased | ** |

*The longitudinal direction of the liquid crystal molecules when the liquid crystal cell is in a bright display state.
**The direction perpendicular to the longitudinal direction of the liquid crystal molecules.

As described above, the conventional in-plane-switching liquid crystal display units cannot avoid tinting of displayed images in certain directions.

In view of the experimental data and considerations described above, the inventors have made the present invention in efforts to suppress tinting in in-plane-switching active-matrix liquid crystal display units.

SUMMARY OF THE INVENTION

It is therefore an object of the present invention to provide an in-plane-switching liquid crystal display unit which suffers minimum tinting of displayed images due to changes in the angle of view and can display high-quality images.

According to a first aspect of the present invention, there is provided an in-plane-switching liquid crystal display unit comprising a two-dimensional matrix of pixel regions each including two auxiliary regions capable of compensating for tinting characteristics of each other. With this arrangement, the directions in which displayed images look bluish and reddish compensate for each other, thereby suppressing tints of the displayed images due to changes in the angle of view, i.e., the angle at which the liquid crystal display unit is observed.

According to a second aspect of the present invention, there is provided an in-plane-switching liquid crystal display unit comprising a two-dimensional matrix of pixel regions each including a first auxiliary region having liquid crystal molecules directed in a first orientation when no electric field is applied thereto, a second auxiliary region having liquid crystal molecules directed in a second orientation extending at 90° with respect to the first orientation when no electric field is applied thereto, and electric field generating means for generating an in-plane electric field in a liquid crystal sealed layer and applying the in-plane electric field to the liquid crystal molecules to rotate the liquid crystal molecules in one direction while maintaining the first orientation and the second orientation at 90° with respect to each other. With this arrangement, when the liquid crystal display unit changes from a dark display state to a bright display state, the directions in which displayed images look bluish and reddish compensate for each other, thereby suppressing tints of the displayed images due to changes in the angle of view.

According to a third aspect of the present invention, in the liquid crystal display unit according to the second aspect, the electric field generating means comprises a plurality of parallel pairs of electrodes disposed in the first auxiliary region and the second auxiliary region, the electrodes disposed in the first auxiliary region extending at 90° with respect to the electrodes disposed in the second auxiliary region. When a voltage is applied, the liquid crystal molecules are rotated in one direction while their first and second orientations are maintained at 90° with respect to each other. Consequently, the directions in which displayed images look bluish and reddish compensate for each other, thereby suppressing tints of the displayed images due to changes in the angle of view.

According to a fourth aspect of the present invention, in the liquid crystal display unit according to the second aspect, the electric field generating means comprises a plurality of parallel pairs of electrodes, the electrodes extending straight in the first auxiliary region and the second auxiliary region, and wherein the liquid crystal molecules are oriented at 45° with respect to a direction in which the electrodes extend in the first auxiliary region and the second auxiliary region when no electric field is applied thereto. This arrangement is also effective in suppressing tints of the displayed images due to changes in the angle of view.

According to a fifth aspect of the present invention, the liquid crystal display unit according to the second aspect further comprises a front substrate and a rear substrate, the pixel regions being disposed between the front substrate and the rear substrate, the liquid crystal molecules have a substantially nil pretilt angle with respect to the front substrate and the rear substrate. With this arrangement, the liquid crystal molecules in the first auxiliary region and the second auxiliary region operate stably.

According to a sixth aspect of the present invention, the liquid crystal display unit according to the second aspect further comprises a front substrate and a rear substrate, the pixel regions being disposed between the front substrate and the rear substrate, wherein the liquid crystal molecules have pretilt angles in a spray-type pattern with respect to the front substrate and the rear substrate, and the pretilt angles of liquid crystal molecules near the front substrate and the rear substrate are different from those of other liquid crystal molecules. With this arrangement, the liquid crystal molecules in the first auxiliary region and the second auxiliary region operate stably.

According to a seventh aspect of the present invention, there is provided an in-plane-switching liquid crystal display unit comprising a two-dimensional matrix of pixel regions each including a first auxiliary region having liquid crystal molecules directed in a first orientation when no electric field is applied thereto, a second auxiliary region having liquid crystal molecules directed in a second orientation which is the same as the first orientation when no electric field is applied thereto, and electric field generating means for generating an in-plane electric field in a liquid crystal sealed layer and applying the in-plane electric field to the liquid crystal molecules to rotate the liquid crystal molecules in opposite directions while maintaining the first orientation and the second orientation in symmetric relationship. With this arrangement, when the liquid crystal display unit is in a bright display state, since the liquid crystal molecules in the first and second auxiliary regions are rotated in opposite directions through substantially 45° with respect to their initial orientations, the orientations of the liquid crystal molecules in the first and second auxiliary regions lie at 90° with respect to each other. Consequently, the directions in which displayed images look bluish and reddish compensate for each other, thereby suppressing tints of the displayed images due to changes in the angle of view. The orientations of the liquid crystal molecules in the first and second auxiliary regions lie at 90° with respect to each other only when the liquid crystal display unit is fully in a bright display state. However, even when the liquid crystal display unit displays intermediate gradations, the tinting compensation is partly achieved to reduce tints of the displayed images much better as compared with the conventional liquid crystal display unit. Furthermore, the liquid crystal display unit can be manufactured relatively simply because the initial orientations of the liquid crystal molecules are not required to be different from each other in the first and second auxiliary regions.

According to an eighth aspect of the present invention, in the liquid crystal display unit according to the seventh aspect, the electric field generating means comprises a plurality of parallel pairs of electrodes, the electrodes extending in the first auxiliary region and the second auxiliary region and being bent to a V shape at a boundary between the first auxiliary region and the second auxiliary region. With this arrangement, the boundary where the electrodes are bent to the V shape divides the two auxiliary regions where the liquid crystal molecules are rotated in opposite directions.

According to a ninth aspect of the present invention, in the liquid crystal display unit according to the seventh aspect, the electric field generating means comprises a plurality of pairs of confronting electrodes each having a longer arm and a shorter arm which extend at a predetermined angle with respect to each other and define a rectangular region, the pairs of confronting electrodes being inverted in the first auxiliary region and the second auxiliary region. The pairs of confronting electrodes each having a longer arm and a shorter arm define a rectangular region such as an elongate rectangular region, a parallelogrammatic region, or a trapezoidal region. Therefore, it is possible to generate an electric field slightly tilted with respect to the shorter arms in the regions surrounded by the electrode pairs. Since the direction in which the electric field is tilted is determined by the layout of the electrode pairs, the liquid crystal molecules are rotated in opposite directions in the two auxiliary regions by inverting the layout of the electrode pairs in the auxiliary regions.

According to a tenth aspect of the present invention, in the liquid crystal display unit according to the ninth aspect, the shorter arms of the electrodes are slightly tilted with respect to a direction perpendicular to each of the first and second orientations of the liquid crystal molecules when no electric field is applied. With this arrangement, the direction of rotation of the liquid crystal molecules is stable even in the vicinity of the shorter arms, making the liquid crystal display unit operate stably, and increasing an allowable range of registration errors in a process of manufacturing the liquid crystal display unit.

According to an eleventh aspect of the present invention, in the liquid crystal display unit according to the seventh aspect, the electric field generating means comprises a plurality of parallel pairs of electrodes disposed in the first auxiliary region and the second auxiliary region, the electrodes disposed in the first auxiliary region extending at 90° with respect to the electrodes disposed in the second auxiliary region, and wherein each of the first and second orientations extends parallel to a direction bisecting an angle formed between a direction in which the electrodes of the parallel pairs extend in the first auxiliary region and a direction in which the electrodes of the parallel pairs extend in the second auxiliary region. This arrangement is also effective in suppressing tints of the displayed images due to changes in the angle of view.

According to a twelfth aspect of the present invention, in the liquid crystal display unit according to the seventh aspect, wherein each of the first and second orientations is substantially the same as a direction in which a liquid crystal material flows when the liquid crystal material is introduced into the first and second auxiliary regions. With this arrangement, a period of time required to introduce the liquid crystal material can be reduced, and an orientation defect called a flow orientation which would otherwise occur after the liquid crystal material is introduced is minimized.

According to a thirteenth aspect of the present invention, the liquid crystal display unit according to the seventh aspect further comprises a front substrate and a rear substrate, the pixel regions being disposed between the front substrate and the rear substrate, the liquid crystal molecules have a substantially nil pretilt angle with respect to the front substrate and the rear substrate. With this arrangement, the liquid crystal molecules in the first and second auxiliary regions operate stably.

According to a fourteenth aspect of the present invention, the liquid crystal display unit according to the seventh aspect further comprises a front substrate and a rear substrate, the pixel regions being disposed between the front substrate and the rear substrate, wherein the liquid crystal molecules have pretilt angles in a spray-type pattern with respect to the front substrate and the rear substrate, and the pretilt angles of liquid crystal molecules near the front substrate and the rear substrate are different from those of other liquid crystal molecules. This arrangement is also effective to operate the liquid crystal molecules stably in the first and second auxiliary regions.

The above and other objects, features, and advantages of the present invention will become apparent from the following description with references to the accompanying drawings which illustrate examples of the present invention.

BRIEF DESCRIPTION OF THE DRAWINGS

FIG. 6A is a sectional plan view of a liquid crystal display unit according to a first embodiment of the present invention;

FIG. 6B is a cross-sectional view taken along line 6B—6B of FIG. 6A;

DETAILED DESCRIPTION OF THE PREFERRED EMBODIMENTS

Various basic forms of a liquid crystal display unit according to the present invention will be described below with reference to FIGS. 5A through 5E.

Figure 5A:
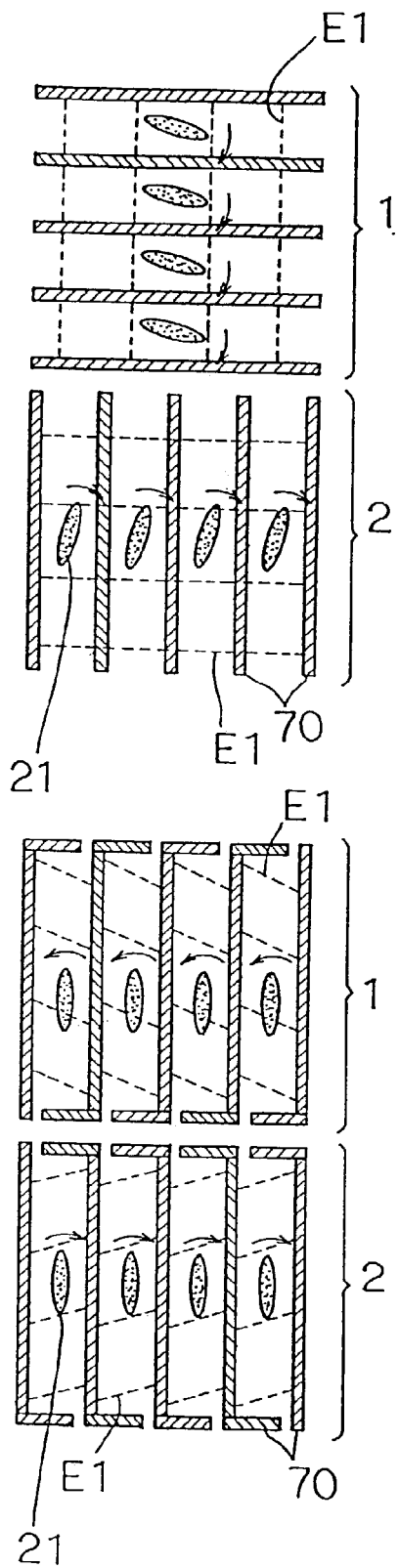
FIGS. 5A through 5E are schematic cross-sectional views of various basic forms of a liquid crystal display unit according to the present invention.

The liquid crystal display unit of the first form shown in FIG. 5A has two auxiliary regions 1, 2 disposed in a pixel region and having liquid crystal molecules 21 whose respective initial orientations lie at 90° with respect to each other. Electrodes 70 disposed in the auxiliary regions 1, 2, which provide parallel electrode pairs for generating electric fields E1 to activate the liquid crystal molecules 21, extend in respective directions that lie at 90° with respect to each other. When a voltage is applied to the liquid crystal display unit, the liquid crystal molecules 21 are rotated in the same direction, clockwise in FIG. 5A, while their orientations remain 90° spaced from each other. Therefore, the directions in which displayed images look bluish and reddish compensate for each other, thereby suppressing tints of the displayed images due to changes in the angle of view, i.e., the angle at which the liquid crystal display unit is observed.

Figure 5B:
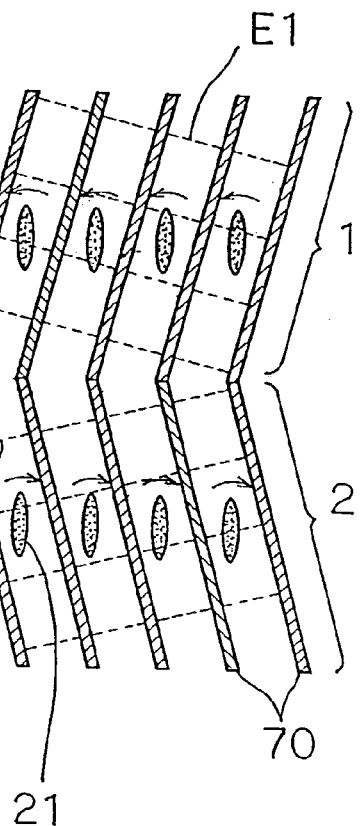

The liquid crystal display unit of the second form shown in FIG. 5B has two auxiliary regions 1, 2 disposed in a pixel region and having liquid crystal molecules 21 whose respective initial orientations lie in the same direction, i.e., parallel to each other. The liquid crystal molecules 21 are activated by an electric field E1 generated by parallel electrode pairs of electrodes 70 which are bent to a V shape at the boundary between the auxiliary regions 1, 2. When a voltage is applied to the liquid crystal display unit, the liquid crystal molecules 21 are rotated counterclockwise in the auxiliary region 1, and clockwise in the auxiliary region 2. When the liquid crystal display unit is in a bright display state, since the liquid crystal molecules 21 are rotated substantially 45° from their initial orientation in each of the auxiliary regions 1, 2, the orientations of the liquid crystal molecules 21 in the auxiliary regions 1, 2 lie at 90° with respect to each other. Consequently, the directions in which displayed images look bluish and reddish compensate for each other, thereby suppressing tints of the displayed images due to changes in the angle of view. The orientations of the liquid crystal molecules 21 in the auxiliary regions 1, 2 lie at 90° with respect to each other only when the liquid crystal display unit is fully in a bright display state. However, even when the liquid crystal display unit displays intermediate gradations, the tinting compensation is partly achieved to reduce tints of the displayed images much better as compared with the conventional in-plane-switching liquid crystal display unit.

Figure 5C:
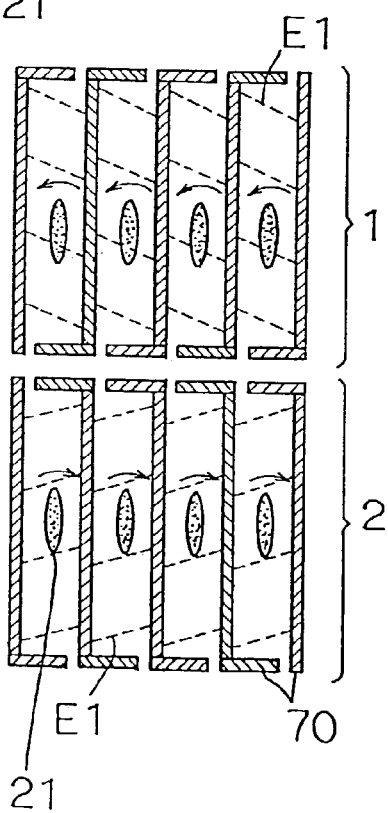

The liquid crystal display unit of the third form shown in FIG. 5C has two auxiliary regions 1, 2 disposed in a pixel region and having liquid crystal molecules 21 whose respective initial orientations lie in the same direction, i.e., parallel to each other. The liquid crystal molecules 21 are activated by an electric field E1 generated by parallel electrode pairs of electrodes 70 each having a longer arm and a shorter arm which extend substantially perpendicularly to each other, such that each pair of electrodes 70 defines an elongate rectangular region therebetween. The electrode pairs in the auxiliary regions 1, 2 are reversed, i.e., turned upside down, with respect to each other.

In each of the elongate rectangular regions surrounded by the electrode pairs shown in FIG. 5C, the electrode pair generates an electric field which is slightly tilted to the direction of the shorter arms of the electrodes 70. The direction in which the electric field which is slightly tilted depends on the layout of the electrode pairs. For example, if the electrode pairs are arranged such that each of the electrodes of the electrode pairs is of an L shape, then the in-plane electric field is tiled slightly counterclockwise (see the auxiliary region 2 in FIG. 5C) with respect to the direction of the shorter arms of the electrodes 70. If the electrode pairs are arranged such that each of the electrodes of the electrode pairs is of an inverted L shape, then the in-plane electric field is tiled slightly clockwise (see the auxiliary region 1 in FIG. 5C) with respect to the direction of the shorter arms of the electrodes 70. For these reasons, when a voltage is applied to the liquid crystal display unit, the liquid crystal molecules 21 are rotated counterclockwise in the auxiliary region 1, and clockwise in the auxiliary region 2. Consequently, the directions in which displayed images look bluish and reddish compensate for each other, thereby suppressing tints of the displayed images due to changes in the angle of view.

Whether the electrode layout shown in FIG. 5C is able to generate an electric field tilted sufficiently to rotate the liquid crystal molecules 21 in desired directions in the auxiliary regions 1, 2 is determined by the ratio of the length of the longer arms to the length of the shorter arms of the electrodes. For example, if the elongate rectangular region surrounded by an electrode pair were too slender, then such an electrode layout would not be preferable because an in-plane electric field is generated in a direction transverse to the longer arms of the electrodes.

As shown in FIG. 5C, each of the electrode pairs for generating the electric field E1 to activate the liquid crystal molecules 21 comprises two confronting electrodes which jointly define an elongate rectangular region therebetween and each comprise a longer arm and a shorter arm that extend substantially perpendicularly to each other. However, the region defined by each of the electrode pairs in surrounding relation to the liquid crystal molecules 21 may be of any shape insofar as the electrodes are capable of generating an electric field slightly tilted with respect to a direction perpendicular to the initial orientation of the liquid crystal molecules 21 within that region. For example, the region defined by each of the electrode pairs may be of a quadrilateral shape such as a parallelogrammatic shape, a trapezoidal shape, or the like other than the elongate rectangular shape as shown in FIG. 5C. Therefore, the angle between the longer and shorter arms of each of the electrodes 70 is not limited to a 90°, but any of various other angles including obtuse angles. The shorter arm of each of the electrodes 70 may be of a curved shape.

Figure 5D:
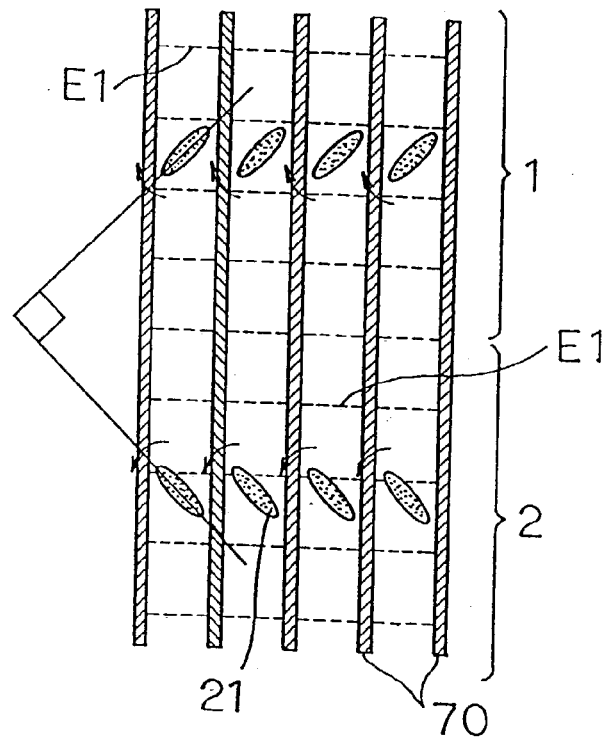

The liquid crystal display unit of the fourth form shown in FIG. 5D has two auxiliary regions 1, 2 disposed in a pixel region and having liquid crystal molecules 21, and electrodes 70 for activating the liquid crystal molecules 21, the electrodes 70 extending in the same direction, i.e., parallel to each other. The liquid crystal molecules 21 in the auxiliary regions 1, 2 have respective initial orientations that lie at 90° with respect to each other. In the auxiliary regions 1, 2, the liquid crystal molecules 21 are aligned such that they are inclined 45° to the direction of the electrodes 70. With the liquid crystal display unit shown in FIG. 5D, the auxiliary regions 1, 2 compensate for each other with respect to their angle of view characteristics thereby to suppress tints of displayed images.

Figure 5E:
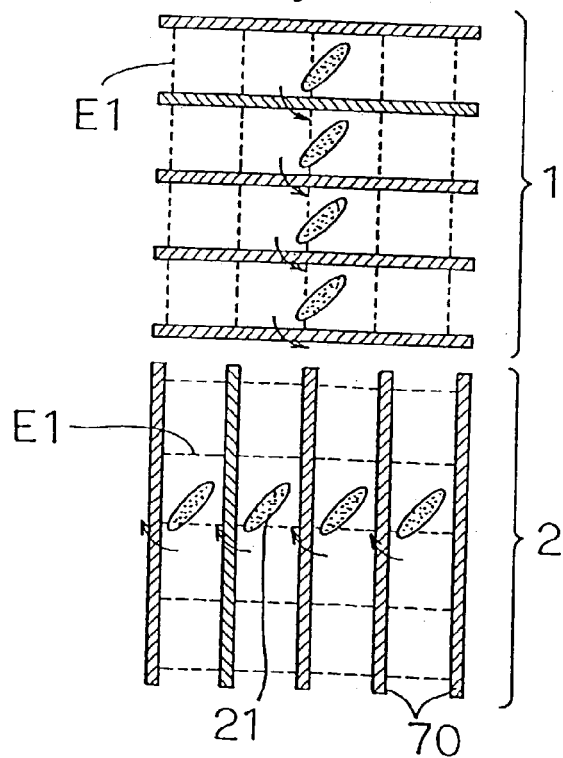

The liquid crystal display unit of the fifth form shown in FIG. 5E has two auxiliary regions 1, 2 disposed in a pixel region and having liquid crystal molecules 21 whose respective initial orientations lie in the same direction, i.e., parallel to each other. Electrodes 70 disposed in the auxiliary regions 1, 2, which provide parallel electrode pairs for generating electric fields E1 to activate the liquid crystal molecules 21, extend in respective directions that lie at 90° with respect to each other. The liquid crystal molecules 21 are oriented parallel to a direction which bisects the angle formed between the direction of the electrodes 70 of the electrode pairs in the auxiliary region 1 and the direction of the electrodes 70 of the electrode pairs in the auxiliary region 2. Specifically, the liquid crystal molecules 21 are oriented uniformly at 45° with respect to the direction of the electrodes 70 in each of the auxiliary regions 1, 2. With the liquid crystal display unit shown in FIG. 5E, the auxiliary regions 1, 2 compensate for each other with respect to their angle of view characteristics thereby to suppress tints of displayed images.

Detailed embodiments of the liquid crystal display unit according to the present invention will be described below with reference to FIGS. 6A, 6B through 15A, 15B. Those parts shown in FIGS. 6A, 6B through 15A, 15B which are identical to those shown in FIGS. 5A through 5E are denoted by identical reference characters.

A liquid crystal display unit according to a first embodiment will be described below with reference to FIGS. 6A and 6B.

As shown in FIG. 6A, the liquid crystal display unit according to the first embodiment comprises a plurality of horizontal gate bus lines 55 and a plurality of vertical drain bus lines 56 which jointly surround pixel regions arranged in a two-dimensional matrix. Active devices 54 are positioned respectively in the vicinity of the points of intersection of the gate bus lines 55 and the drain bus lines 56 and associated with the pixel regions, respectively.

Each of the pixel regions has first and second auxiliary regions 1, 2. A source electrode 71 and a common electrode 72 are each of a planar shape comprising a combination of vertical and horizontal ladder structures. Specifically, the vertical ladder structures of the source electrode 71 and the common electrode 72 are disposed in the first auxiliary region 1, and the horizontal ladder structures of the source electrode 71 and the common electrode 72 are disposed in the second auxiliary region 2. The source electrode 71 and the common electrode 72 have crosspieces positioned alternately with each other. The source electrode 71 and the common electrode 72 are partly superimposed one over the other through an interlayer insulating film 57 (see FIG. 6B). The superimposed region of the source electrode 71 and the common electrode 72 provides an added capacitance. In order to prevent line breaks, the common electrode 72 extend over pixels which are disposed adjacent to each other in the direction in which the gate bus lines 55 extend, with two upper and lower lines a, b shown in FIG. 6A.

As shown in FIG. 6B, the common electrode 72, the source electrode 71, and the drain bus lines 56 are disposed on a first substrate 11. The common electrode 72 is insulated from the source electrode 71 and the drain bus lines 56 by the interlayer insulating film 57. Although not shown in FIGS. 6A and 6B, the gate bus lines 55 are also insulated from the source electrode 71 and the drain bus lines 56 by the interlayer insulating film 57. The above structure disposed on the first substrate 11 is covered with a protective insulating film 59. On the surface of an active matrix substrate which is of the structure described above, there is disposed an alignment film 31 comprising an insulative organic polymeric film for aligning the surface of the active matrix substrate.

Color filters (not shown) of three primaries R, G, B are disposed in association with the pixel regions on a second substrate (front substrate) 12 which confronts the active matrix substrate (rear substrate). A light-shield black matrix (not shown) is disposed in regions other than the pixel regions. Another alignment film 32 comprising an insulative organic polymeric film is disposed on the second substrate 12 for aligning the surface thereof.

The active matrix substrate and the confronting substrate face each other with their inner surfaces supporting the alignment films 31, 32, and are spaced from each other with a liquid crystal layer 20 sealed therebetween. Two polarizers (not shown) are disposed respectively on outer surfaces of the substrates.

The surfaces of the alignment films 31, 32 are processed so orient liquid crystal molecules 21 as shown in FIG. 6A in the first and second auxiliary regions 1, 2. Specifically, the liquid crystal molecules 21 are oriented by the alignment films 31, 32 such that the liquid crystal molecules 21 are slightly shifted clockwise from a direction parallel to the crosspieces of the source electrode 71 or the common electrode 72 when no electric field is applied, and the liquid crystal molecules 21 in the first and second auxiliary regions 1, 2 have respective initial orientations (orientations when no electric field is applied) that lie at 90° with respect to each other. The liquid crystal layer 20 comprises a nematic liquid crystal layer, and has positive (p-type) dielectric anisotropy. If a liquid crystal layer of negative (n-type) dielectric anisotropy is employed, then the liquid crystal molecules 21 may be oriented at an angle that is 90° different from the illustrated angle in each of the first and second auxiliary regions 1, 2.

The axes of transmission of the polarizers are perpendicular to each other. The axis of transmission of one of the polarizers is aligned with the initial orientation of the liquid crystal molecules in the first auxiliary region 1, whereas the axis of transmission of the other polarizer is aligned with the initial orientation of the liquid crystal molecules in the second auxiliary region 2.

A process of manufacturing the liquid crystal display unit according to the first embodiment will be described below. First, the gate bus lines 55 and the common electrode 72 which are made of Cr are formed on the glass substrate 11, and then covered with the interlayer insulating film 57 which is made of silicon nitride (SiNx). Then, an amorphous silicone (a-Si) film serving as an active transistor layer is formed over the gate bus lines 55 with the interlayer insulating film 57 interposed therebetween. The drain bus lines 56 and the source electrode 71 which are made of Cr are thereafter formed. The above structure is then covered with the protective insulating film 59 which is made of SiNx.

A glass substrate on which color filters and a light-shield black matrix have been disposed is purchased and used as the other glass substrate 12.

Alignment films of polyimide are formed respectively on the surfaces of the active matrix substrate thus constructed and the color filter substrate. The alignment films are then aligned in divided regions by a mask rubbing process using a photoresist such that the initial orientations of the liquid crystal molecules 20 in the first and second auxiliary regions 1, 2 lie at 90° with respect to each other, as described above. Thereafter, the substrates are placed in confronting relation to each other and spaced 4.5 μm from each other, and a nematic liquid crystal material whose refractive index anisotropy Δn is 0.067 is introduced within a vacuum chamber. Subsequently, the polarizers are applied to the respective outer surfaces of the substrates.

While the alignment films are aligned in divided regions by a mask rubbing process using a photoresist in this embodiment, the alignment films may be aligned in divided regions by applying polarized light to the divided regions.

With the structure shown in FIG. 6A, when a voltage is applied, the orientations of the liquid crystal molecules 20 in the first and second auxiliary regions 1, 2 are rotated in one direction (clockwise) while being angularly spaced 90° from each other. Therefore, the directions in which displayed images look bluish and reddish compensate for each other, thereby suppressing tints of the displayed images due to changes in the angle of view.

A liquid crystal display unit according to a second embodiment of the present invention will be described below with reference to FIG. 7.

Figure 7:
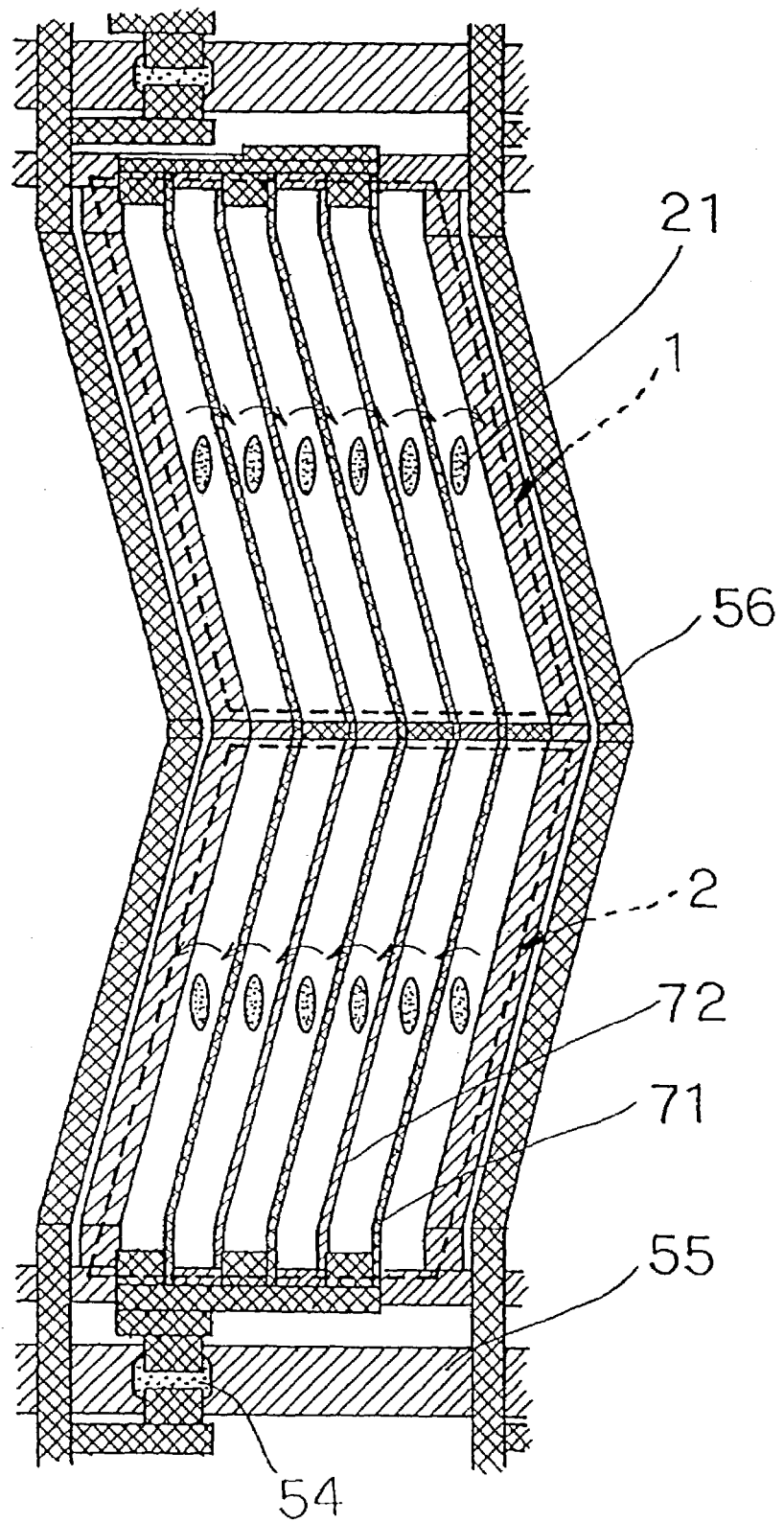
FIG. 7 is a sectional plan view of a liquid crystal display unit according to a second embodiment of the present invention.

As shown in FIG. 7, the liquid crystal display unit according to the second embodiment comprises a plurality of horizontal gate bus lines 55 and a plurality of vertical drain bus lines 56 which jointly surround pixel regions arranged in a two-dimensional matrix. Active devices 54 are positioned respectively in the vicinity of the points of intersection of the gate bus lines 55 and the drain bus lines 56 and associated with the pixel regions, respectively.

In FIG. 7, the drain bus lines 56 are bent in their vertical direction such that each of the pixel regions in the two-dimensional matrix is of a V shape.

Each of the pixel regions has first and second auxiliary regions 1, 2. A source electrode 71 and a common electrode 72 for generating a liquid crystal activating electric field are each of a planar shape comprising a horizontal ladder structure as viewed in FIG. 7. The ladder structure has crosspieces that are bent to a V shape along the drain bus lines 56 in each of the pixel regions, which is divided into the first and second auxiliary regions 1, 2, disposed in upper and lower positions in FIG. 7, at the bend of the crosspieces. Because of the V shape, the electrodes are tilted counterclockwise with respect to the vertical direction in FIG. 7 within the first auxiliary region 1, and clockwise with respect to the vertical direction in FIG. 7 within the second auxiliary region 2.

The structure of the liquid crystal display unit shown in FIG. 7 has a cross-sectional shape similar to the cross-sectional shape of the liquid crystal display unit according to the first embodiment shown in FIG. 6B. Alignment films 31, 32 are disposed on the respective surfaces of glass substrates 11, 12. Unlike the liquid crystal display unit shown in FIG. 6A, however, the liquid crystal molecules 21 shown in FIG. 7 are uniformly oriented parallel to each other vertically in FIG. 7.

Polarizers mounted on the respective outer surfaces of the substrates have respective axes of transmission which are perpendicular to each other. The direction of the axis of transmission of one of the polarizers is in agreement with the uniform initial orientation of the liquid crystal molecules.

The liquid crystal display unit according to the second embodiment shown in FIG. 7 can be manufactured in substantially the same manner as with the liquid crystal display unit according to the first embodiment shown in FIGS. 6A and 6B except the orientation of the liquid crystal molecules and the direction of the axes of transmission of the polarizers.

When a voltage is applied to the liquid crystal display unit shown in FIG. 7, a liquid crystal activating electric field is generated in a direction slightly tilted counterclockwise with respect to the horizontal direction in the first auxiliary region 1, whereas a liquid crystal activating electric field is generated in a direction slightly tilted clockwise with respect to the horizontal direction in the second auxiliary region 2. In response to the generated liquid crystal activating electric field, the liquid crystal molecules 21 which have been uniformly oriented vertically under no electric field are rotated clockwise in the first auxiliary region 1 and counterclockwise in the second auxiliary region 2.

When the liquid crystal display unit is in a bright display state, the liquid crystal molecules 21 in each of the first and second auxiliary regions 1, 2 are rotated substantially 45° with respect to the initial orientation thereof. Therefore, the orientations of the liquid crystal molecules 21 in the first and second auxiliary regions 1, 2 lie at 90° with respect to each other. Therefore, the directions in which displayed images look bluish and reddish compensate for each other, thereby suppressing tints of the displayed images due to changes in the angle of view. The orientations of the liquid crystal molecules 21 in the auxiliary regions 1, 2 lie at 90° with respect to each other only when the liquid crystal display unit is fully in a bright display state. However, even when the liquid crystal display unit displays intermediate gradations, the tinting compensation is partly achieved to reduce tints of the displayed images much better as compared with the conventional in-plane-switching liquid crystal display unit.

The liquid crystal display unit according to the second embodiment shown in FIG. 7 is advantageous in that the process of manufacturing same is simpler than the process of manufacturing the liquid crystal display unit according to the first embodiment shown in FIG. 6A because it is not necessary to make the initial orientations of the liquid crystal molecules different in the respective auxiliary regions.

A liquid crystal display unit according to a third embodiment of the present invention will be described below with reference to FIG. 8.

Figure 8:
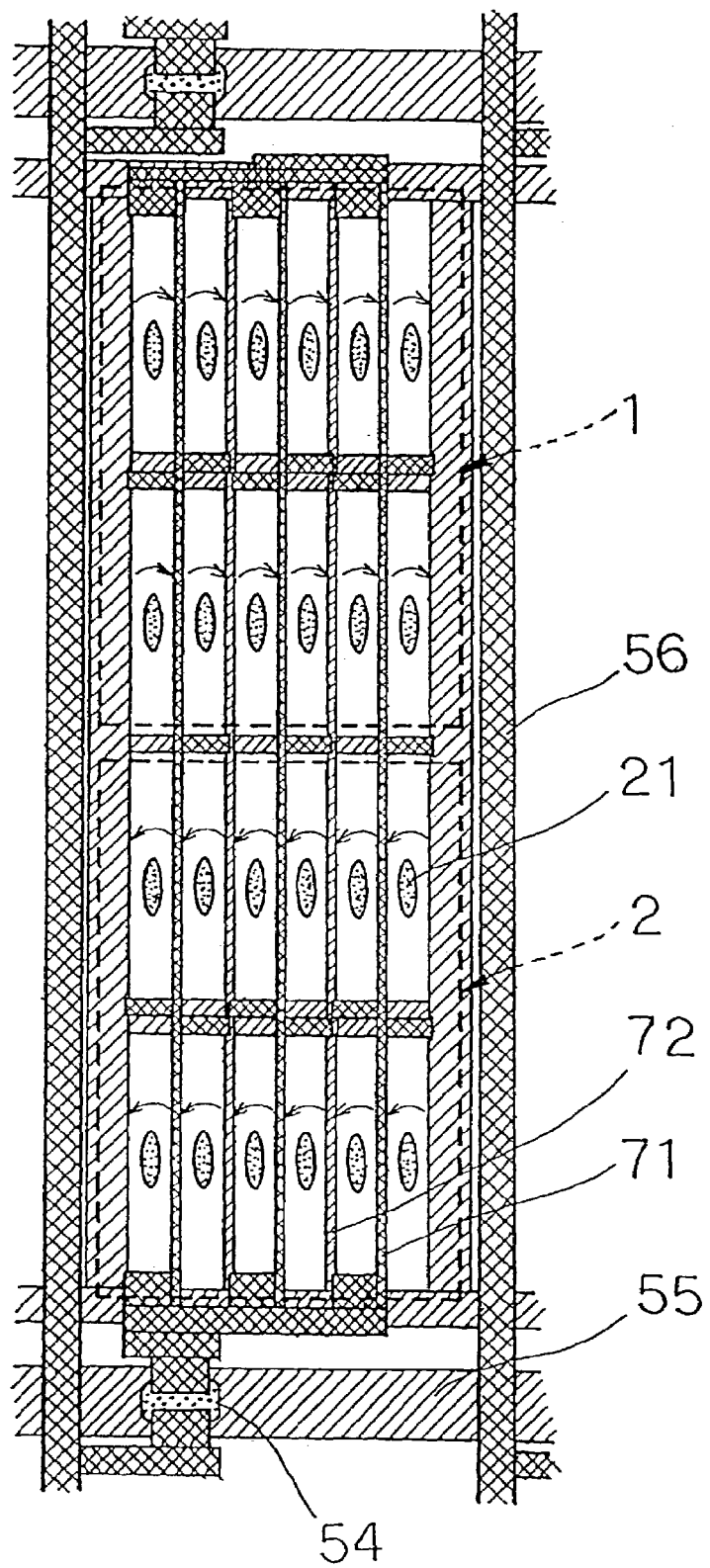
FIG. 8 is a sectional plan view of a liquid crystal display unit according to a third embodiment of the present invention.

As shown in FIG. 8, the liquid crystal display unit according to the third embodiment comprises a plurality of horizontal gate bus lines 55 and a plurality of vertical drain bus lines 56 which jointly surround pixel regions arranged in a two-dimensional matrix. Active devices 54 are positioned respectively in the vicinity of the points of intersection of the gate bus lines 55 and the drain bus lines 56 and associated with the pixel regions, respectively.

Each of the pixel regions has first and second auxiliary regions 1, 2. Each of the first and second auxiliary regions 1, 2 has a plurality of elongate rectangular regions surrounded by a source electrode 71 and a common electrode 72. Each of the elongate rectangular regions is defined by an electrode pair comprising the source electrode 71 and the common electrode 72 which confront each other and comprise a longer arm and a shorter arm which extend substantially perpendicularly to each other. The rectangular regions in each of the auxiliary regions 1, 2 are surrounded by electrode pairs of the same arrangement. The electrode pairs in the auxiliary regions 1, 2 are reversed, i.e., turned upside down, with respect to each other. Specifically, each of the rectangular regions in the first auxiliary region 1 is surrounded by a pair of electrodes of an L shape, and each of the rectangular regions in the second auxiliary region 2 is surrounded by a pair of electrodes of an inverted L shape.

The structure of the liquid crystal display unit shown in FIG. 8 has a cross-sectional shape similar to the cross-sectional shape of the liquid crystal display unit according to the first embodiment shown in FIG. 6B. Alignment films 31, 32 are disposed on the respective surfaces of glass substrates 11, 12. Unlike the liquid crystal display unit shown in FIG. 6A, however, the liquid crystal molecules 21 shown in FIG. 8 are uniformly oriented parallel to each other vertically in FIG. 8.

Polarizers mounted on the respective outer surfaces of the substrates have respective axes of transmission which are perpendicular to each other. The direction of the axis of transmission of one of the polarizers is in agreement with the uniform initial orientation of the liquid crystal molecules.

The liquid crystal display unit according to the third embodiment shown in FIG. 8 can be manufactured in the same manner as with the liquid crystal display unit according to the first embodiment shown in FIGS. 6A and 6B.

In the elongate rectangular regions surrounded by the electrode pairs, it is possible to generate an electric field which is slightly tilted with respect to the direction of the shorter arms of the electrodes. The direction in which the electric field is slightly tilted depends on the layout of the electrode pairs. When a voltage is applied to the liquid crystal display unit shown in FIG. 8, a liquid crystal activating electric field is generated in a direction slightly tilted counterclockwise with respect to the horizontal direction in the first auxiliary region 1, whereas a liquid crystal activating electric field is generated in a direction slightly tilted clockwise with respect to the horizontal direction in the second auxiliary region 2. In response to the generated liquid crystal activating electric field, the liquid crystal molecules 21 which have been uniformly oriented vertically parallel to each other under no electric field are rotated clockwise in the first auxiliary region 1 and counterclockwise in the second auxiliary region 2.

Figure 1:
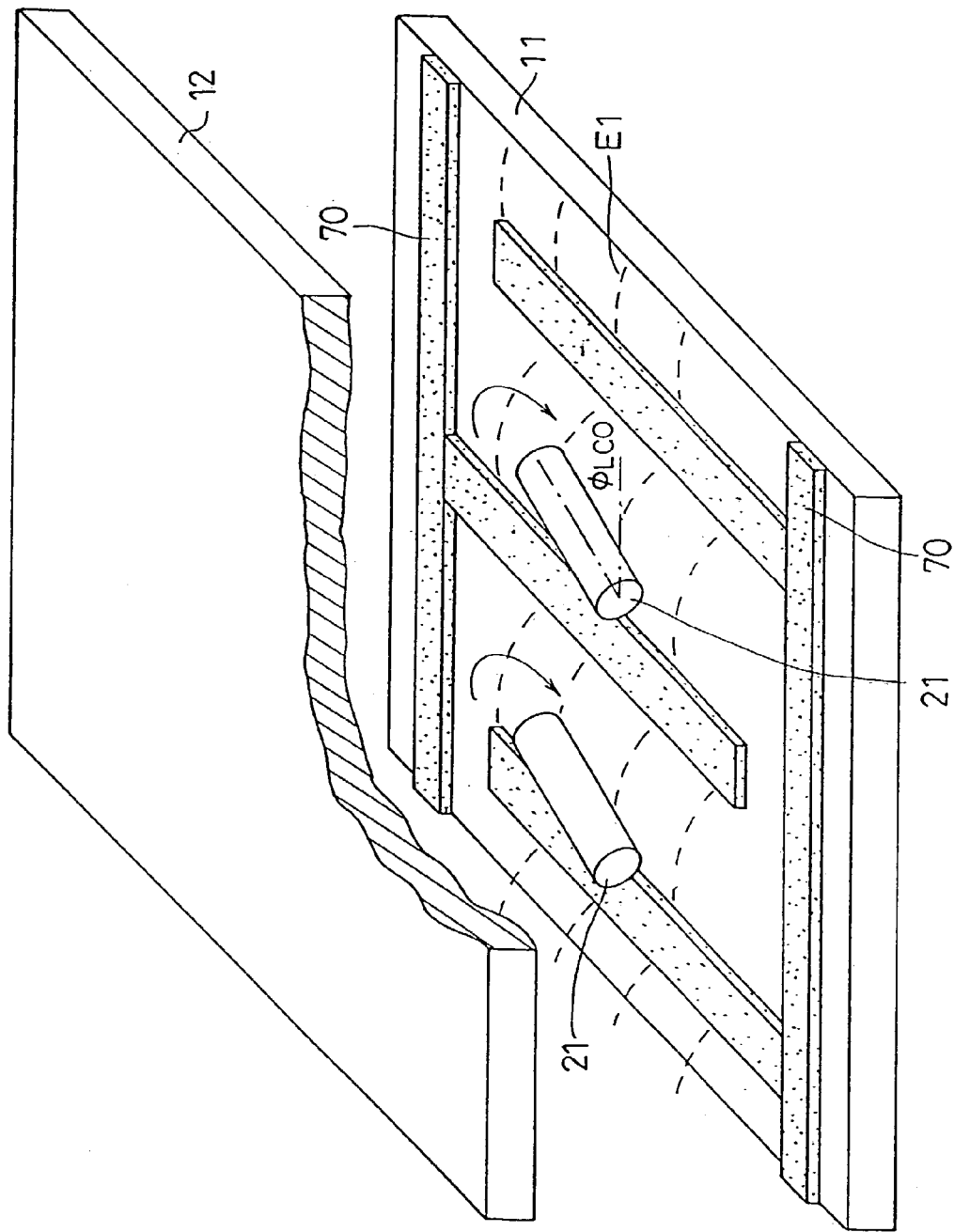
FIG. 1 is a fragmentary perspective view of a conventional in-plane-switching liquid crystal display unit.
Figure 2:
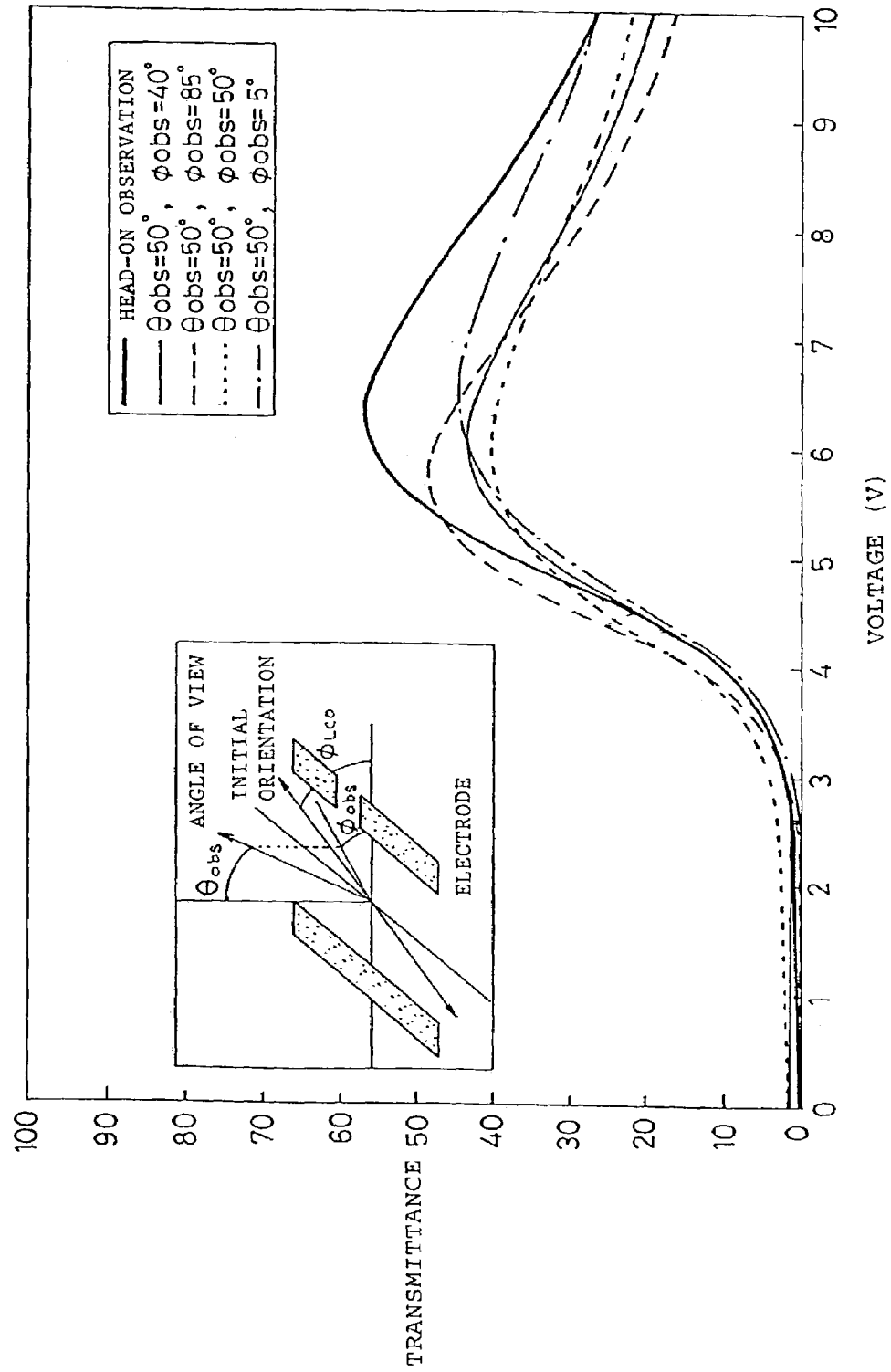
FIG. 2 is a graph showing how the transmittance of the in-plane-switching liquid crystal display unit shown in FIG. 1 varies with the applied voltage in various observational directions.
Figure 3:
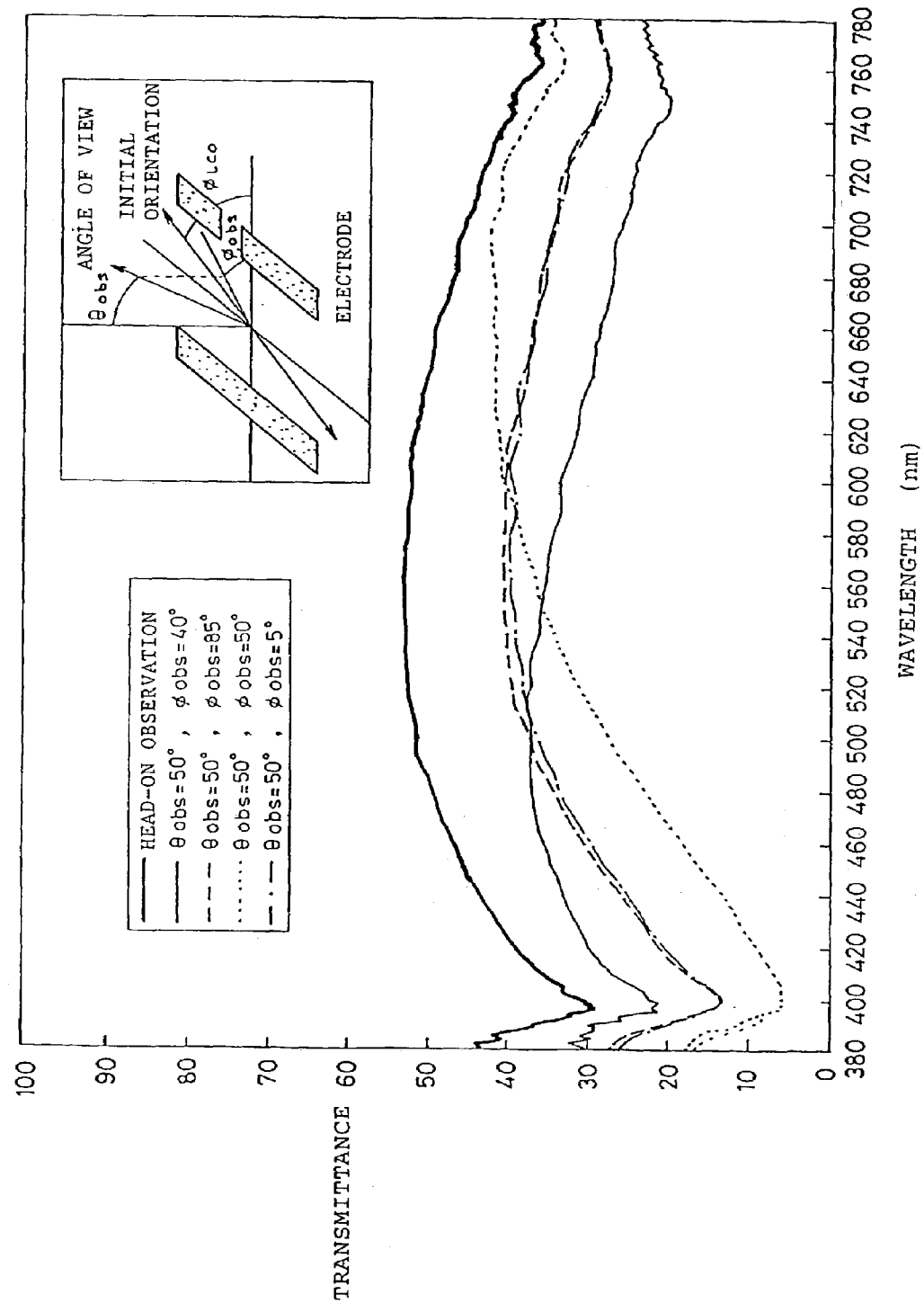
FIG. 3 is a graph showing how the transmittance of the in-plane-switching liquid crystal display unit shown in FIG. 1 varies with the wavelength in various observational directions when the in-plane-switching liquid crystal display unit is in a bright display state.
Figure 4A:
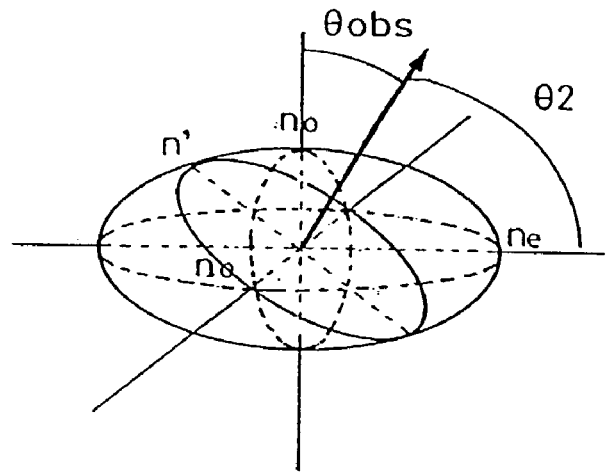
FIGS. 4A and 4B are diagrams illustrative of the refractive index anisotropy as it varies with the angle of view.
Figure 4B:
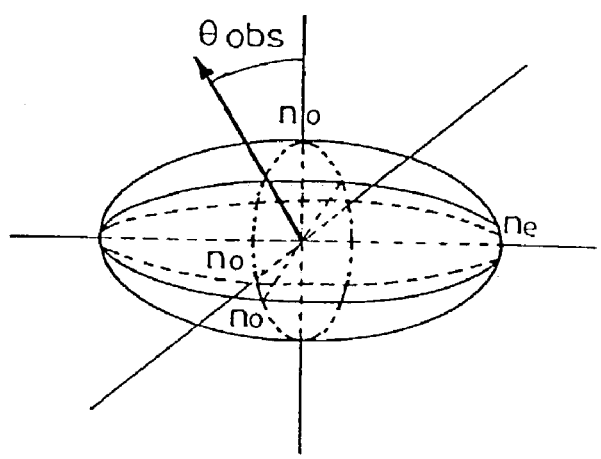

When the liquid crystal display unit is in a bright display state, the liquid crystal molecules 21 in each of the first and second auxiliary regions 1, 2 are rotated substantially 45° with respect to the initial orientation thereof. Therefore, the orientations of the liquid crystal molecules 21 in the first and second auxiliary regions 1, 2 lie at 90° with respect to each other. Therefore, the directions in which displayed images look bluish and reddish compensate for each other, thereby suppressing tints of the displayed images due to changes in the angle of view. The orientations of the liquid crystal molecules 21 in the auxiliary regions 1, 2 lie at 90° with respect to each other only when the liquid crystal display unit is fully in a bright display state. However, even when the liquid crystal display unit displays intermediate gradations, the tinting compensation is partly achieved to reduce tints of the displayed images much better as compared with the conventional in-plane-switching liquid crystal display unit as shown in FIG. 1.

The liquid crystal display unit according to the third embodiment shown in FIG. 8 is advantageous in that the process of manufacturing same is simpler than the process of manufacturing the liquid crystal display unit according to the first embodiment shown in FIG. 6A because it is not necessary to make the initial orientations of the liquid crystal molecules different in the respective auxiliary regions. According to the third embodiment, furthermore, the pixel regions in the two-dimensional matrix are not in a bent configuration, but the drain bus lines 56 extend straight in the vertical direction in FIG. 8. Since the liquid crystal display unit according to the third embodiment shown in FIG. 8 is simpler in its entirety than the liquid crystal display unit according to the second embodiment shown in FIG. 7, it is less subject to defects which may be caused by breaks or the like of the drain bus lines 56.

A liquid crystal display unit according to a fourth embodiment of the present invention will be described below with reference to FIG. 9.

Figure 9:
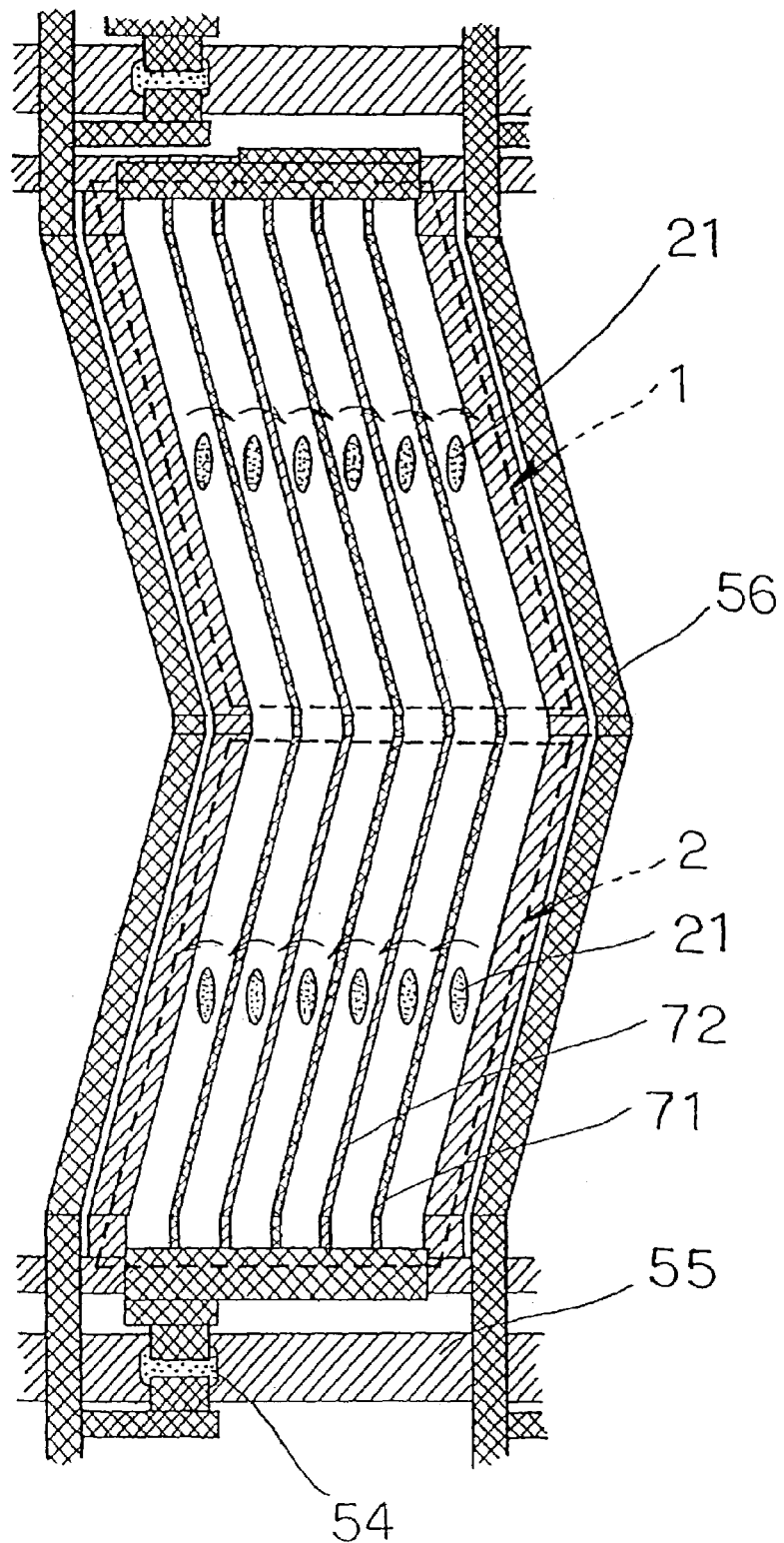
FIG. 9 is a sectional plan view of a liquid crystal display unit according to a fourth embodiment of the present invention.

As shown in FIG. 9, the liquid crystal display unit according to the fourth embodiment comprises a plurality of horizontal gate bus lines 55 and a plurality of vertical drain bus lines 56 which jointly surround pixel regions arranged in a two-dimensional matrix. Active devices 54 are positioned respectively in the vicinity of the points of intersection of the gate bus lines 55 and the drain bus lines 56 and associated with the pixel regions, respectively.

In FIG. 9, a source electrode 71 and a common electrode 72 for generating a liquid crystal activating electric field are bent to a V shape.

Each of the pixel regions has first and second auxiliary regions 1, 2. Each of the first and second auxiliary regions 1, 2 has a plurality of parallelogrammatic regions surrounded by the source electrode 71 and the common electrode 72. Each of the parallelogrammatic regions is defined by a pair of confronting electrodes comprising the source electrode 71 and the common electrode 72 each having a longer arm and a shorter arm that extent at an obtuse angle with respect to each other.

The parallelogrammatic regions in each of the auxiliary regions 1, 2 are surrounded by electrode pairs of the same arrangement. The electrode pairs in the auxiliary regions 1, 2 are reversed, i.e., turned upside down, with respect to each other. Specifically, each of the parallelogrammatic regions in the first auxiliary region 1 is surrounded by a pair of electrodes of an L shape, and each of the parallelogrammatic regions in the second auxiliary region 2 is surrounded by a pair of electrodes of an inverted L shape.

The liquid crystal display unit according to the fourth embodiment is capable of displaying images uniformly and stably because the liquid crystal molecules are not rotated in a direction opposite to the desired direction in each of the auxiliary regions even in areas where the electrodes are bent to the V shape and end areas of the pixel regions.

A liquid crystal display unit according to a fifth embodiment of the present invention will be described below with reference to FIG. 10.

Figure 10:
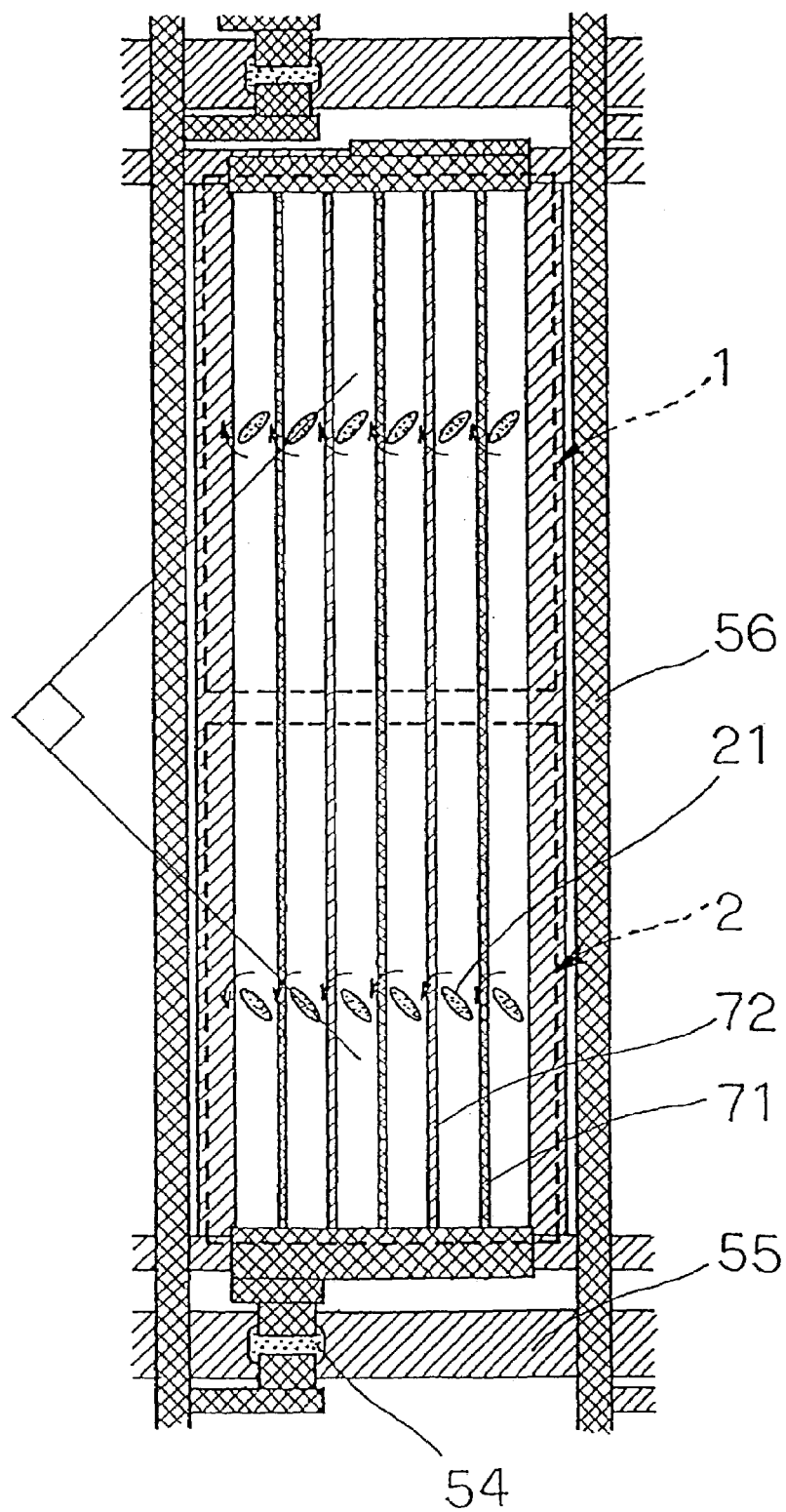
FIG. 10 is a sectional plan view of a liquid crystal display unit according to a fifth embodiment of the present invention.

As shown in FIG. 10, the liquid crystal display unit according to the fifth embodiment comprises a plurality of horizontal gate bus lines 55 and a plurality of vertical drain bus lines 56 which jointly surround pixel regions arranged in a two-dimensional matrix. Active devices 54 are positioned respectively in the vicinity of the points of intersection of the gate bus lines 55 and the drain bus lines 56 and associated with the pixel regions, respectively.

The liquid crystal display unit also has a source electrode 71 and a common electrode 72 which extend parallel to each other as with the conventional liquid crystal display unit shown in FIG. 1. The source electrode 71 and the common electrode 72 are each of a planar shape comprising a horizontal ladder structure as viewed in FIG. 10. Liquid crystal molecules 21 in first and second auxiliary regions 1, 2 have respective initial orientations which lie at 90° with respect to each other. The liquid crystal molecules 21 in each of the first and second auxiliary regions 1, 2 are oriented such that their longitudinal axes extend at 45° with respect to the direction in which the source electrode 71 and the common electrode 72 extend. With the liquid crystal display unit according to the fifth embodiment, the first and second auxiliary regions 1, 2 compensate for each other with respect to the angle of view characteristics, thereby suppressing tints of the displayed images due to changes in the angle of view.

Figure 11:
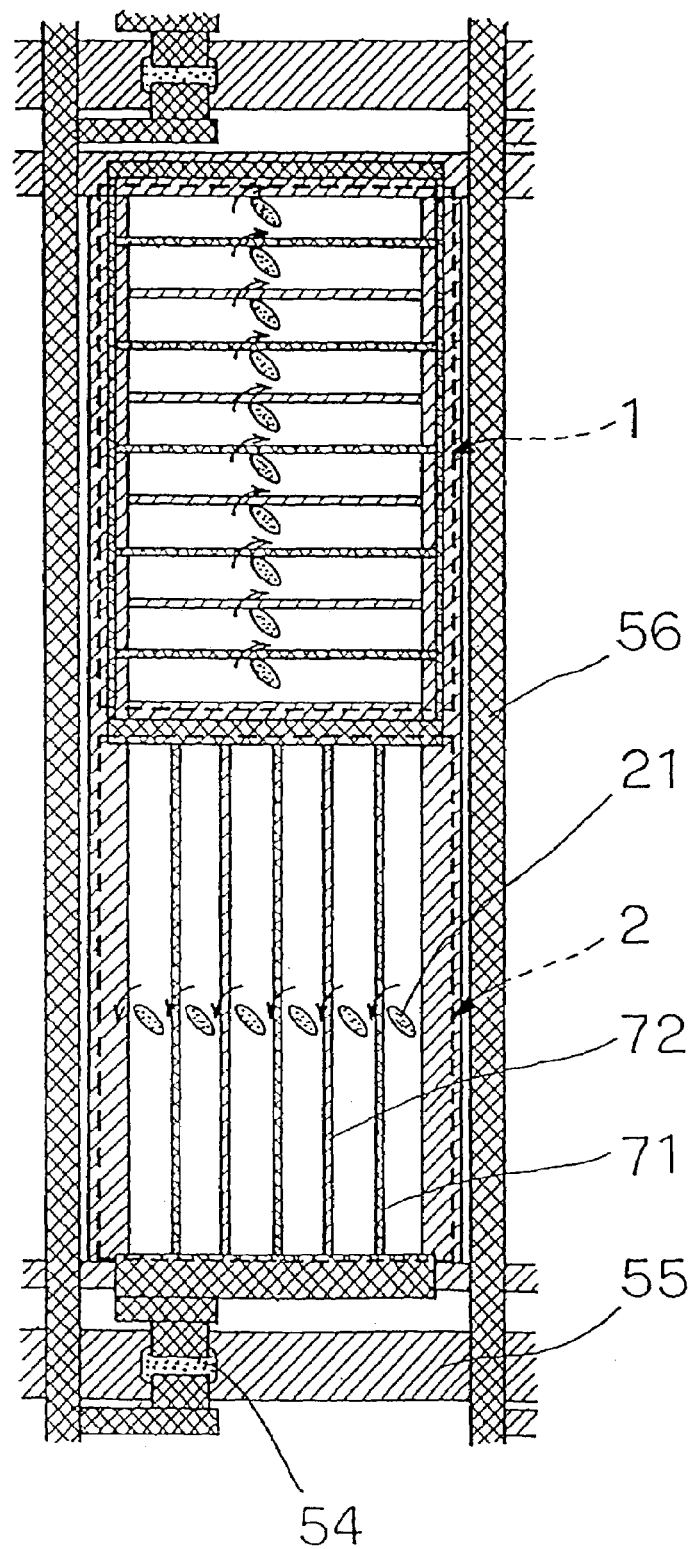
FIG. 11 is a sectional plan view of a liquid crystal display unit according to a sixth embodiment of the present invention.

A liquid crystal display unit according to a sixth embodiment of the present invention will be described below with reference to FIG. 11.

The liquid crystal display unit according to the sixth embodiment is essentially the same as the liquid crystal display unit according to the first embodiment shown in FIG. 6A. The directions of a source electrode 71 and a common electrode 72 for generating a liquid crystal activating electric field lie at 90° with respect to each other in first and second auxiliary regions 1, 2. In the sixth embodiment, however, liquid crystal molecules in the first and second auxiliary regions 1, 2 are initially oriented uniformly in the same direction. The liquid crystal molecules 21 are oriented parallel to a direction which bisects the angle formed between the direction of the source electrode 71 and the common electrode 72 in the first auxiliary region 1 and the direction of the source electrode 71 and the common electrode 72 in the second auxiliary region 2. Specifically, the liquid crystal molecules 21 are oriented uniformly at 45° with respect to the direction of the source electrode 71 and the common electrode 72 in each of the auxiliary regions 1, 2.

The liquid crystal display unit according to the sixth embodiment is capable of suppressing tints of the displayed images due to changes in the angle of view because the liquid crystal molecules 21 are rotated in opposite directions in the first and second auxiliary regions 1, 2 when a voltage is applied to the liquid crystal display unit.

A liquid crystal display unit according to a seventh embodiment of the present invention will be described below with reference to FIGS. 12 and 13.

Figure 12:
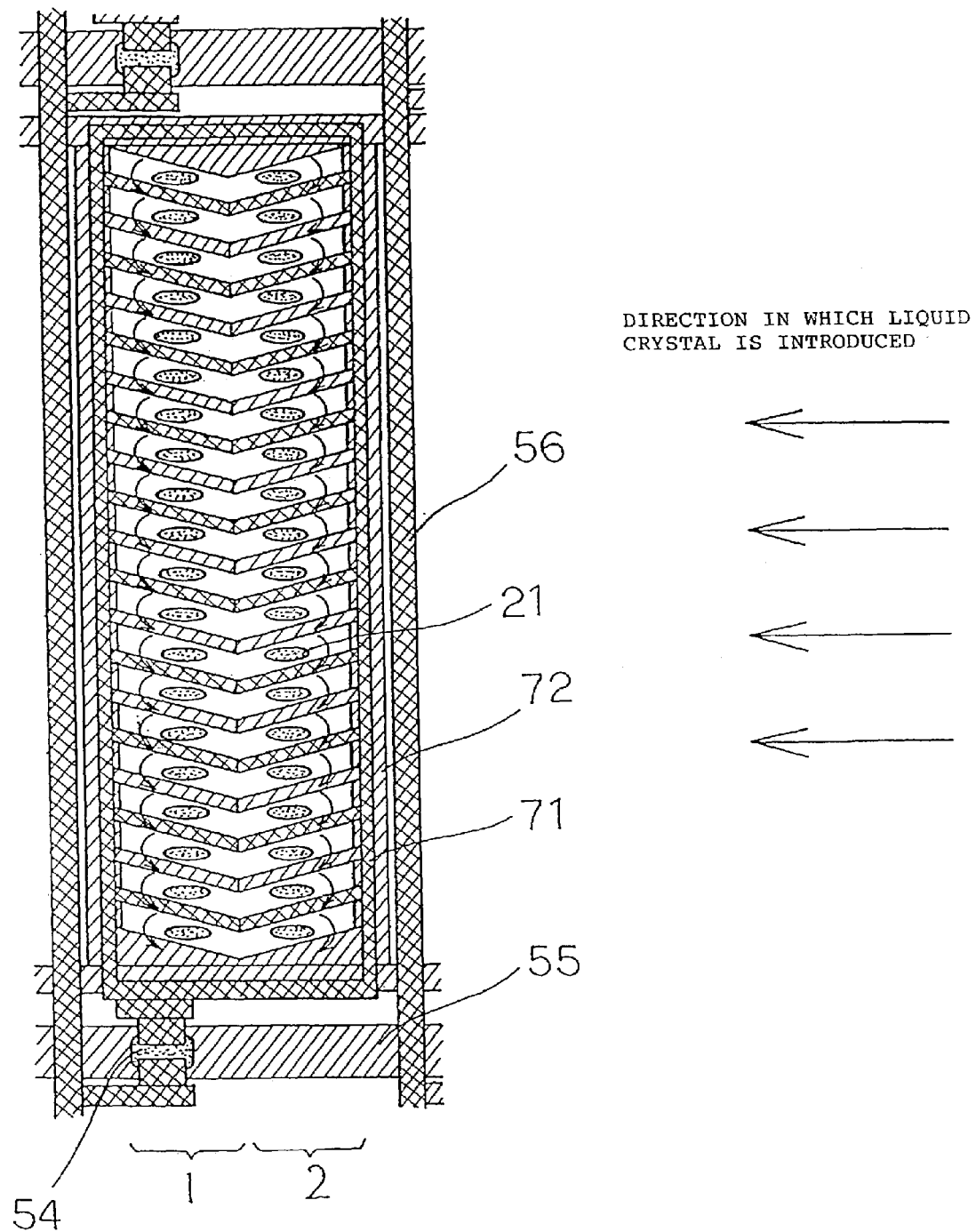
FIG. 12 is a sectional plan view of a liquid crystal display unit according to a seventh embodiment of the present invention.
Figure 13:
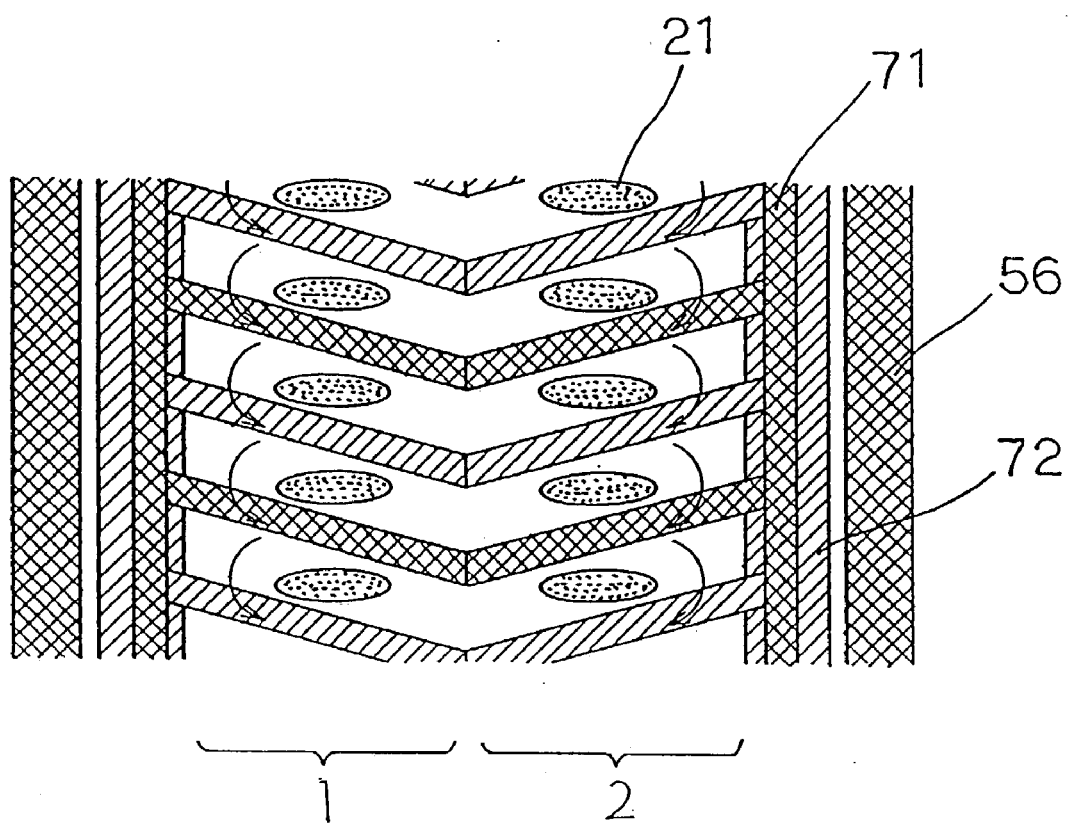
FIG. 13 is an enlarged fragmentary sectional plan view of the liquid crystal display unit shown in FIG. 12.

As shown in FIGS. 12 and 13, the liquid crystal display unit according to the seventh embodiment comprises a plurality of horizontal gate bus lines 55 and a plurality of vertical drain bus lines 56 which jointly surround pixel regions arranged in a two-dimensional matrix. Active devices 54 are positioned respectively in the vicinity of the points of intersection of the gate bus lines 55 and the drain bus lines 56 and associated with the pixel regions, respectively.

A source electrode 71 and a common electrode 72 for generating a liquid crystal activating electric field extend generally horizontally as with the gate bus lines 55 and are bent to a V shape. Liquid crystal molecules 21 are uniformly oriented parallel to each other in the horizontal direction in FIGS. 12 and 13 along the direction of the gate bus lines 55. After two substrates (the substrates 11, 12 shown in FIG. 6B) are combined with each other with a given spacing therebetween, a liquid crystal material is introduced so as to flow horizontally into the space between the combined substrates. The direction of the axis of transmission of one of the polarizers is in agreement with the initial orientation of the liquid crystal molecules.

The pixel regions are divided into the first and second auxiliary regions 1, 2 at the V vend of the source electrode 71 and the common electrode 72. When a liquid crystal activating electric field is generated, the liquid crystal molecules 21 are rotated counterclockwise in the first auxiliary region 1 and clockwise in the second auxiliary region 2.

According to the seventh embodiment, the source electrode 71 and the common electrode 72 are bent to a V shape as with the second embodiment shown in FIG. 7 and the fourth embodiment shown in FIG. 9. Since the gate bus lines 55 or the drain bus lines 56 are not bent, but straight, however, the liquid crystal display unit is not too complex in structure, and hence can be manufactured with a high yield.

Furthermore, because the initial orientation of the liquid crystal molecules 21 and the direction in which the liquid crystal material flows into the space between the substrates are the same as each other, the liquid crystal material can easily be introduced in a reduced period of time. In addition, an orientation defect called a flow orientation which would otherwise occur after the liquid crystal material is introduced is minimized.

A liquid crystal display unit according to an eighth embodiment of the present invention will be described below with reference to FIG. 14.

The liquid crystal display unit according to the eighth embodiment is similar to the liquid crystal display unit according to the seventh embodiment shown in FIGS. 12 and 13 except for those features described below. FIG. 14 shows the features of the liquid crystal display unit according to the eighth embodiment.

As with the fourth embodiment shown in FIG. 9, the liquid crystal display unit according to the eighth embodiment is arranged to cause liquid crystal molecules to rotate stably in desired directions in each of the auxiliary regions even in areas where the electrodes are bent to the V shape and end areas of the pixel regions. Specifically, each of the first and second auxiliary regions 1, 2 has a plurality of parallelogrammatic regions surrounded by the source electrode 71 and the common electrode 72. Each of the parallelogrammatic regions is defined by a pair of confronting electrodes comprising the source electrode 71 and the common electrode 72 each having a longer arm and a shorter arm that extent at an obtuse angle with respect to each other.

The parallelogrammatic regions in each of the auxiliary regions 1, 2 are surrounded by electrode pairs of the same arrangement. The electrode pairs in the auxiliary regions 1, 2 are reversed, i.e., turned upside down, with respect to each other. Specifically, each of the parallelogrammatic regions in the first auxiliary region 1 is surrounded by a pair of electrodes of an L shape, and each of the parallelogrammatic regions in the second auxiliary region 2 is surrounded by a pair of electrodes of an inverted L shape.

The shorter arms of the source electrode 71 and the common electrode 72 extend in directions different from the directions of the shorter arms according to the ninth embodiment shown in FIG. 9, i.e., are slightly tilted with respect to a direction perpendicular to the initial orientation of the liquid crystal molecules 21, at such an angle that the angle formed between the longer and shorter arms is greater than if the shorter arms are not tilted.

Figure 14:
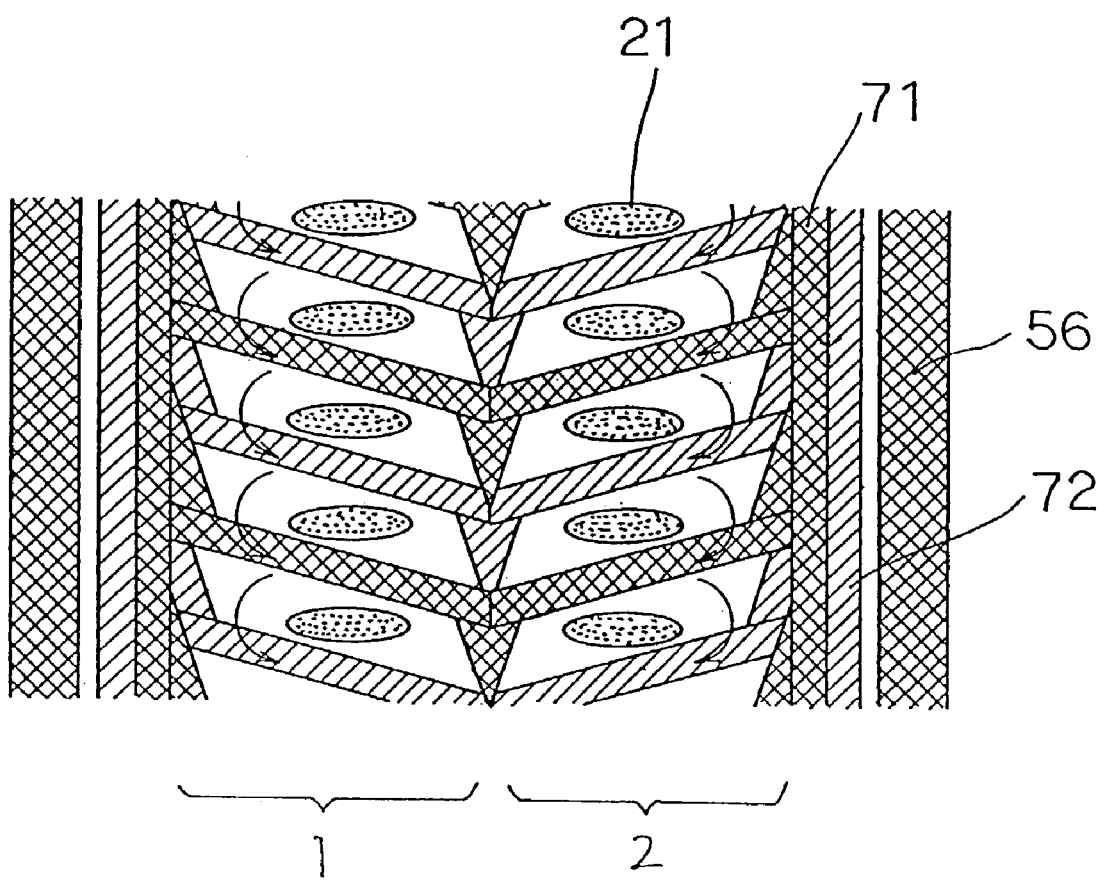
FIG. 14 is an enlarged fragmentary sectional plan view of a liquid crystal display unit according to an eighth embodiment of the present invention.

The structure shown in FIG. 14 is advantageous for the following reasons: If the shorter arms of the source electrode 71 and the common electrode 72 are directed perpendicularly to the initial orientation of the liquid crystal molecules 21 as with the fourth embodiment shown in FIG. 9, then since a liquid crystal activating electric field generated in the vicinity of poles of the shorter arms (the electric field is generated perpendicularly to arms of the electrodes in the vicinity of poles of the electrodes) is parallel to the initial orientation of the liquid crystal molecules, a torque for rotating the liquid crystal molecules is generated in such an area. As a result, the direction in which the liquid crystal molecules rotate is not stable. According to the structure shown in FIG. 14, however, the shorter arms of the source electrode 71 and the common electrode 72 are slightly tilted with respect to a direction perpendicular to the initial orientation of the liquid crystal molecules 21, at such an angle that the angle formed between the longer and shorter arms is greater than if the shorter arms are not tilted. Therefore, even in the vicinity of the poles of the shorter arms, there is produced a torque for rotating the liquid crystal molecules in the same direction as in other areas in the same auxiliary region. Consequently, the liquid crystal molecules can be rotated more stably.

The liquid crystal display unit according to the eighth embodiment offers an additional advantage as follows; Inasmuch as the shorter arms of the source electrode 71 and the common electrode 72 are tilted, particularly, the shorter arms in peripheral areas of the pixel regions remote from the V-bend areas are tilted, an allowable range of registration errors in the manufacturing process is greater than with the fourth embodiment shown in FIG. 9.

As described above, the shorter arms of the source electrode 71 and the common electrode 72 are slightly tilted with respect to the direction perpendicular to the initial orientation of the liquid crystal molecules in both the peripheral areas of the pixel regions and the V-bend areas. However, the shorter arms of the source electrode 71 and the common electrode 72 may be slightly tilted in either the peripheral areas of the pixel regions or the V-bend areas. Solely for the purpose of increasing an allowable range of registration errors in the manufacturing process, for example, the shorter arms in peripheral areas of the pixel regions may be tilted, but the shorter arms in the V-bend areas may be of the same arrangement as shown in FIG. 9.

Figure 15A:
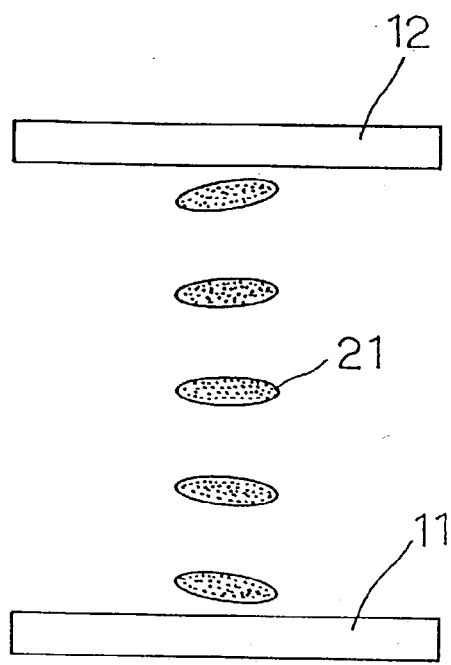
FIGS. 15A and 15B are schematic views of a liquid crystal display unit according to a ninth embodiment of the present invention.
Figure 15B:
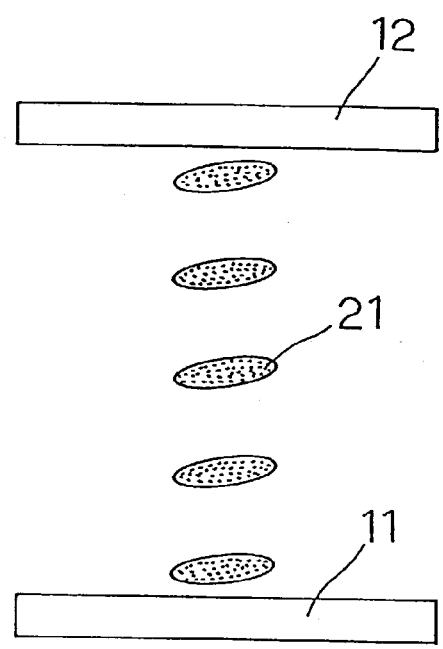

A liquid crystal display unit according to a ninth embodiment of the present invention will be described below with reference to FIGS. 15A and 15B.

The liquid crystal display unit according to the ninth embodiment resides in the initial orientation of liquid crystal molecules, more specifically, the direction of a pretilt of liquid crystal molecules with respect to substrates.

In the structure shown in FIG. 14, the liquid crystal molecules are uniformly oriented, and are rotated in different directions in the respective first and second auxiliary regions due to the electrode configuration when a liquid crystal activating electric field is generated. In order to rotate the liquid crystal molecules stably in each of the first and second auxiliary regions, it is preferable that the liquid crystal molecules be initially oriented equally in both the first and second auxiliary regions. Specifically, in FIG. 14, the initial orientation of the liquid crystal molecules should preferably be perpendicular as accurately as possible to a bisector of the V-shaped angle between the source electrode 71 and the common electrode 72, and should preferably be as parallel as possible to the substrates (the substrates 11, 12 shown in FIG. 6B) in a three-dimensional space. According to a rubbing process used for the usual liquid crystal alignment, it is known that the liquid crystal molecules are oriented with a pretilt angle with respect to the substrates. The pretilt angle typically ranges from 2° to 5° depending on the alignment film material used. Consequently, rather than uniformly orienting the liquid crystal molecules between the substrates as shown in FIG. 15B, the liquid crystal molecules should be oriented in a spray-type orientation pattern by which the pretilt angle of those liquid crystal molecules near the substrates does not match the pretilt angle of the other liquid crystal molecules, so that the liquid crystal molecules will be oriented generally parallel to the substrates as a whole. The spray-type orientation pattern allows the liquid crystal molecules to operate stably in each of the first and second auxiliary regions. The spray-type orientation pattern is applicable not only to the eighth embodiment shown in FIG. 14, but also to the other embodiments.

A liquid crystal display unit according to a tenth embodiment of the present invention will be described below.

As described above with respect to the ninth embodiment, the initial orientation of the liquid crystal molecules be as parallel as possible to the substrates for this purpose, the liquid crystal display unit according to the tenth embodiment uses a liquid crystal alignment film material whose pretilt angle is substantially nil. Specifically, the liquid crystal alignment film material comprises a liquid crystal alignment film material JALS-428 manufactured by Japan Synthetic Rubber Co., Ltd. With this liquid crystal alignment film material used, the liquid crystal molecules are oriented in a direction perpendicular to the rubbing direction, and the pretilt angle is substantially nil. Consequently, the liquid crystal molecules each of the first and second auxiliary regions can be operated stably. Among other liquid crystal alignment film materials whose pretilt angle is substantially nil is a liquid crystal alignment film material SE-1180 manufactured by Nissan Chemical Industries, Ltd., which has a very small pretilt angle (ranging from about 0° to 1°) though it orients the liquid crystal molecules in a direction parallel to the rubbing direction.

While preferred embodiments of the present invention have been described using specific terms, such description is for illustrative purposes only, and it is to be understood that changes and variations may be made without departing from the spirit or scope of the following claims.

What is claimed is:

1. An in-plane-switching liquid crystal display unit comprising a two-dimensional matrix of pixel regions each including:
    a first region having liquid crystal molecules directed in a first orientation when no electric field is applied thereto;
    a second region having liquid crystal molecules directed in a second orientation which is the same as said first orientation when no electric field is applied thereto; and
    electric field generating means for generating an in-plane electric field to said liquid crystal molecules to rotate the liquid crystal molecules of the first and second regions in opposite directions with respect to each other while maintaining said first orientation and second orientation in symmetric relationship;
    wherein said electric field generating means comprises a plurality of pairs of confronting electrodes each having a longer arm and a shorter arm which extend at a predetermined angle with respect to each other and define a rectangular region, said pairs of confronting electrodes being inverted in said first region with respect to those pairs in said second region.

2. An in-plane-switching liquid crystal display unit according to claim 1, wherein the shorter arms of the electrodes are slightly tilted with respect to a direction perpendicular to each of said first and second orientations of the liquid crystal molecules when no electric field is applied.

3. A liquid crystal display device comprising:
    a first substrate having a plurality of pixels each defined by adjacent ones of a plurality of gate bus lines and adjacent ones of a plurality of data bus lines, each of said pixels including a common electrode and an active element, said active element having a gate electrode, a first electrode and a second electrode, said gate electrode being connected to an associated one of said gate bus lines and said first electrode being connected to an associated one of said data bus lines;

a second substrate; and a liquid crystal sandwiched between said first and second substrates, rotation of molecules of said liquid crystal being controlled by electric fields formed between said second electrode and said common electrode;

said common electrode including a pair of first portions extending in a direction of said gate bus lines, and at least one second portion extending in a direction of crossing said gate bus lines to connect said pair of first portions to each other said at least one second portion including a bend, said pair of first portions being elongated over a plurality of pixels arranged in the direction of said gate lines, and said second electrode including at least one third portion cooperating with said second portion of said common electrode to produce said electric field.

4. The device as claimed in claim 3, wherein said second portion of said common electrode bends in a V-letter shape.

5. The device as claimed in claim 3, wherein said gate bus lines and said common electrode are formed on said first substrate, and wherein said data bus lines, said first electrode and said second electrode are formed on an insulating film covering said gate bus line, said common electrode and said first substrate.

6. The device as claimed in claim 5, wherein said second electrode further comprises a pair of fourth portions overlapping said pair of first portions with an intervention of said second insulating film, and wherein said third portion is formed to connect said pair of said fourth portions to each other.

7. A liquid crystal display device comprising:

a first substrate;

a plurality of gate bus lines formed over said first substrate in a first direction;

a plurality of pairs of common bus lines formed over said first substrate in said first direction, each of said pairs of common bus lines being formed between a corresponding adjacent two gate bus lines;

a plurality of sets of common electrodes formed over said first substrate, each of said sets of common electrodes connecting an associated one of said pairs of common bus lines to each other, said at least one of said common eletrodes including a bend;

a plurality of data bus lines formed over said first substrate in a second direction intersecting said first direction;

a plurality of active elements each provided at a corresponding one of intersections of said gate bus lines and said data bus lines, each of said active elements having a gate electrode connected to an associated one of said gate bus line, a first electrode connected to an associated one of said data bus lines and a second electrode cooperating with an associated one of said plurality sets of said common electrodes to produce an electric field therebetween;

a second substrate; and a liquid crystal sandwiched between said first and second substrate.

8. The device as claimed in claim 7, wherein said gate bus lines, said common bus lines, said common electrodes and said gate electrode are made of a conductive layer at a first level, and wherein said data bus lines, said first electrode and said second electrode are made of a conductive layer at a second level that is different from said first level.

9. The device as claimed in claim 8, wherein each of said common electrodes bends in a V-letter shape at least once.

10. A liquid crystal display device comprising:

a first substrate having a plurality of pixels each defined by adjacent ones of a plurality of gate bus lines and adjacent ones of a plurality of data bus lines, each of said pixels including a common electrode and an active element, said active element having a gate electrode, a first electrode and a second electrode, said gate electrode being connected to an associated one of said gate bus lines and said first electrode being connected to an associated one of said data bus lines;

a second substrate; and a liquid crystal sandwiched between said first and second substrates, rotation of molecules of said liquid crystal being controlled by electric fields formed between said second electrode and said common electrode;

wherein one of said common electrode and said second electrode has first and second portions extending in parallel to each other and first and second protrusions, the other of said common electrode and said second electrode having a third portion extending between said first and second portions in parallel thereto and having third and fourth protrusions;

and wherein said pixel includes a first sub-area having first, second, third and fourth sides and a second sub-area having fifth, sixth, seventh and eighth sides, said first side being defined by said first portion, said second and fifth sides being defined by said third portion, said sixth side being defined by said second portion, two of said third, fourth, seventh and eighth sides being defined by said first and second protrusions, and a remaining two of said third, fourth, seventh and eighth sides being defined by said third and fourth protrusions;

wherein in said first sub-area an electric field is provided between said first portion and said third portion, and in said second sub-area an electric field is provided between said second portion and said third portion.

11. The device as claimed in claim 10, wherein each of said first, second, third and fourth protrusions has a flat end side to define an associated side of said first and second sub-areas.

12. The device as claimed in claim 10, wherein each of said first, second, third and fourth protrusions has a slant end side to define an associated side of said first and second sub-areas.

13. The device as claimed in claim 10, wherein each of said first, second and third portions are bent at least once to respectively divide said first sub-area into first and second segment areas and said second sub-area into third and fourth segment areas, and wherein the molecules of said liquid crystal in said first and third segment areas are rotated in one direction and the molecules of said liquid crystal in said second and fourth segment areas are rotated in an opposite direction in response to said electric fields.

14. An in-plane-switching liquid crystal display unit comprising a two-dimensional matrix of pixel regions each including:

a first region having a plurality of first parallel pairs of electrodes;

a second region having a plurality of second parallel pairs of electrodes which are not parallel to said first parallel pairs of electrodes; and an electrode structure extending to a boundary portion between said first region and said second region, said boundary portion including first boundary electrodes connected to one electrode of said first parallel pairs of electrodes and second boundary electrodes connected to another electrode of said first parallel pairs of electrodes;

wherein said first boundary electrodes and said second boundary electrodes are arranged alternately along said boundary portion.

15. The device as claimed in claim 3, wherein said bend is provided at a boundary between a first region of said liquid crystal and a second region of said liquid crystal.

16. The device as claimed in claim 7, wherein said bend is provided at a boundary between a first region of said liquid crystal and a second region of said liquid crystal.

17. The device as claimed in claim 10, further comprising a second electrode structure extending to said boundary portion between said first region and said second region, said second electrode structure being connected to another electrode of said first parallel pairs of electrodes, and arranged at an obtuse angle with said other electrode of said first parallel pairs of electrodes.

* * * * *